(12) United States Patent
Yamashita

(10) Patent No.: US 8,311,093 B2
(45) Date of Patent: Nov. 13, 2012

(54) SIGNAL TRANSMISSION APPARATUS AND SIGNAL TRANSMISSION METHOD

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 534 days.

(21) Appl. No.: 12/423,904

(22) Filed: Apr. 15, 2009

(65) Prior Publication Data

US 2009/0290634 A1 Nov. 26, 2009

(30) Foreign Application Priority Data

May 26, 2008 (JP) ................................. 2008-137245

(51) Int. Cl.
*H04N 11/04* (2006.01)
(52) U.S. Cl. .................................. 375/240.01
(58) Field of Classification Search ........................ None
See application file for complete search history.

(56) References Cited

U.S. PATENT DOCUMENTS

| | | | | |
|---|---|---|---|---|
| 6,081,291 A * | 6/2000 | Ludwig, Jr. | ................. | 348/14.11 |
| 6,690,428 B1 * | 2/2004 | Hudelson et al. | ............. | 348/461 |
| 2005/0281296 A1 | 12/2005 | Yamashita | | |
| 2006/0050883 A1 * | 3/2006 | Walker et al. | ................. | 380/239 |
| 2007/0286423 A1 * | 12/2007 | Soda et al. | ..................... | 380/239 |
| 2008/0013845 A1 * | 1/2008 | Fukuhara et al. | ............. | 382/240 |

FOREIGN PATENT DOCUMENTS

| | | |
|---|---|---|
| JP | 2002-34005 | 1/2002 |
| JP | 2004-88272 | 3/2004 |
| JP | 2004-120799 | 4/2004 |
| JP | 2005-328494 | 11/2005 |
| JP | 2006-13830 | 1/2006 |
| JP | 2007-306539 | 11/2007 |

* cited by examiner

*Primary Examiner* — Thai Tran
*Assistant Examiner* — Sunghyoun Park
(74) *Attorney, Agent, or Firm* — Oblon, Spivak, McClelland, Maier & Neustadt, L.L.P.

(57) ABSTRACT

When transmitting an input image signal and an audio signal inputted in synchronization with the input image signal, each frame in the input image signal are divided into first, second, third, and fourth subimages and pixel samples of the subimages are mapped onto image data regions of two-channel HD-SDI signals, respectively, and the audio signal is mapped onto supplementary data regions included in horizontal ancillary data spaces of any of the two-channel HD-SDI signals onto which the subimages are respectively mapped. The pixel samples mapped onto the image data regions of the two-channel HD-SDI signals are multiplexed onto an image data region of a first transfer data stream and the audio signal mapped onto the supplemental data regions included in horizontal ancillary data spaces of any of the two-channel HD-SDI signals is multiplexed onto a horizontal ancillary data space of a second transfer data stream.

5 Claims, 27 Drawing Sheets

EXAMPLE OF 48kHz AUDIO DATA PACKET

EXAMPLE OF 96kHz AUDIO DATA PACKET

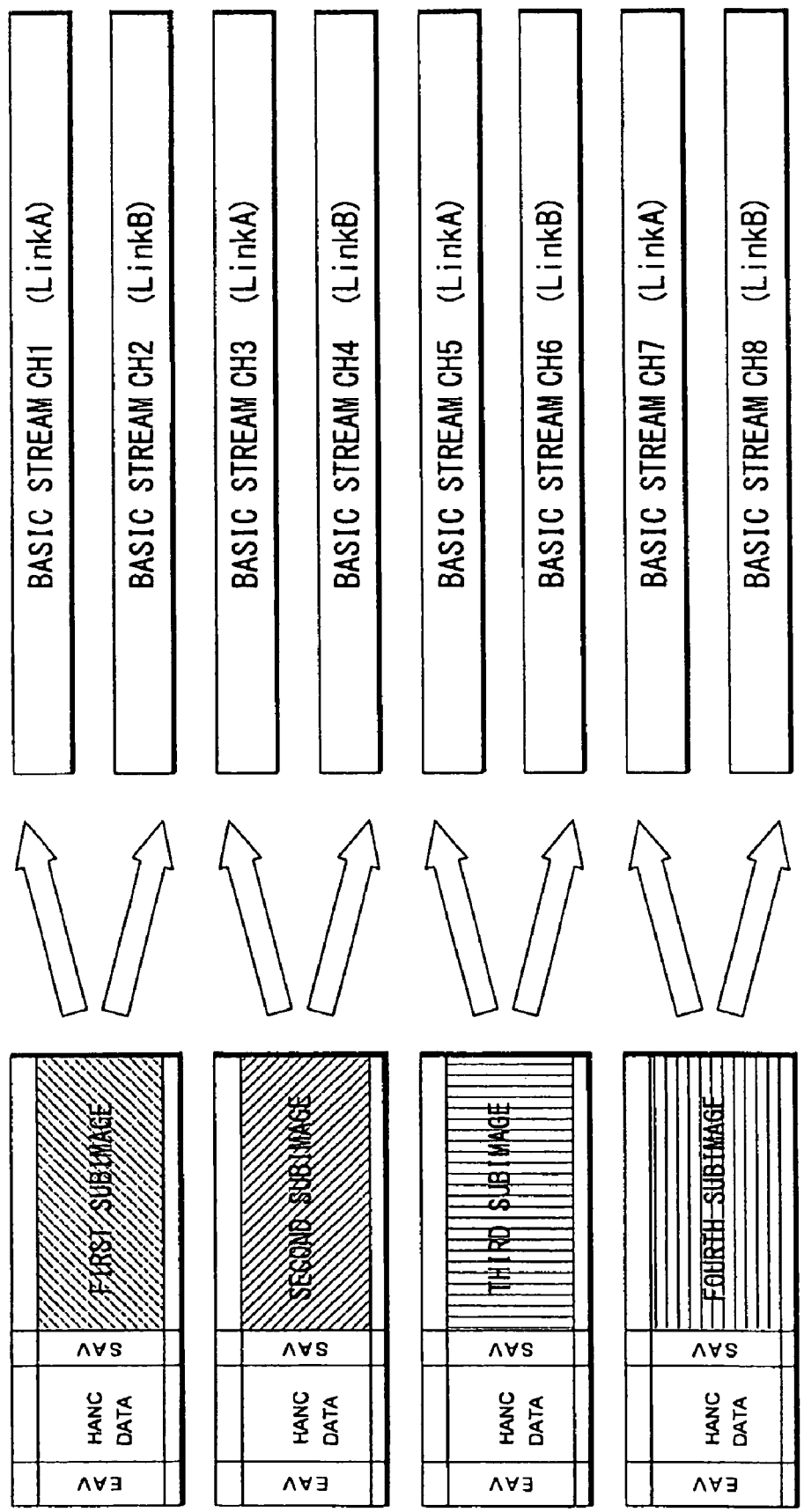

FIG. 15

| | Frame rate | | 96 kHz | 48 kHz | 44.1 kHz | 32 kHz |
|---|---|---|---|---|---|---|
| 1920×1080 | 60P | No | 2 | 1 | 1 | 1 |
| | | CONDITION | 2×1124 > 1600 | 1124 > 800 | 1124 > 735 | 1124 > 533.333 |
| | | Na | 2 | 1 | 1 | 1 |
| | 60/1.001P | No | 2 | 1 | 1 | 1 |
| | | CONDITION | 2×1124 > 1601.6 | 1124 > 800.8 | 1124 > 735.735 | 1124 > 533.866 |
| | | Na | 2 | 1 | 1 | 1 |
| | 50P | No | 2 | 1 | 1 | 1 |
| | | CONDITION | 2×1124 > 1920 | 1124 > 960 | 1124 > 882 | 1124 > 640 |
| | | Na | 2 | 1 | 1 | 1 |
| | 30P | No | 3 | 2 | 2 | 1 |
| | | CONDITION | 3×1123 > 3200 | 2×1123 > 1600 | 2×1123 > 1470 | 1×1123 > 1066.66 |
| | | Na | 3⇒4 | 2 | 2 | 1 |
| | 30/1.001P | No | 3 | 2 | 2 | 1 |
| | | CONDITION | 3×1123 > 3203.2 | 2×1123 > 1600 | 2×1123 > 1471.47 | 1×1123 > 1067.73 |
| | | Na | 3⇒4 | 2 | 2 | 1 |
| | 25P | No | 4 | 2 | 2 | 2 |
| | | CONDITION | 4×1123 > 3840 | 2×1123 > 1920 | 2×1123 > 1764 | 2×1123 > 1280 |
| | | Na | 4 | 2 | 2 | 2 |
| | 24P | No | 4 | 2 | 2 | 2 |
| | | CONDITION | 4×1123 > 4000 | 2×1123 > 2000 | 2×1123 > 1837.5 | 2×1123 > 1333.33 |
| | | Na | 4 | 2 | 2 | 2 |
| | 24/1.001P | No | 4 | 2 | 2 | 2 |
| | | CONDITION | 4×1123 > 4004 | 2×1123 > 2002 | 2×1123 > 1839.33 | 2×1123 > 1334.66 |
| | | Na | 4 | 2 | 2 | 2 |
| 720P | 60P | No | 3 | 2 | 1 | 1 |
| | | CONDITION | 3×749 > 1600 | 2×749 > 800 | 1×749 > 735 | 1×749 > 533.33 |
| | | Na | 3⇒4 | 2 | 1 | 1 |
| | 60/1.001P | No | 3 | 2 | 1 | 1 |
| | | CONDITION | 3×749 > 1601.6 | 2×749 > 800.8 | 1×749 > 735.735 | 1×749 > 533.866 |
| | | Na | 3⇒4 | 2 | 1 | 1 |
| | 50P | No | 3 | 2 | 2 | 1 |
| | | CONDITION | 3×749 > 1920 | 2×749 > 960 | 2×749 > 882 | 1×749 > 640 |
| | | Na | 3⇒4 | 2 | 2 | 1 |
| | 30P | No | 5 | 3 | 2 | 2 |
| | | CONDITION | 5×749 > 3200 | 3×749 > 1600 | 2×749 > 1470 | 2×749 > 1066.66 |
| | | Na | 5⇒6 | 3 | 2 | 2 |
| | 30/1.001P | No | 5 | 3 | 2 | 2 |
| | | CONDITION | 5×749 > 3203.2 | 3×749 > 1601.6 | 2×749 > 1471.47 | 2×749 > 1067.73 |
| | | Na | 5⇒6 | 3 | 2 | 2 |
| | 25P | No | 6 | 3 | 3 | 2 |
| | | CONDITION | 6×749 > 3840 | 3×749 > 1920 | 3×749 > 1764 | 2×749 > 1280 |
| | | Na | 6 | 3 | 3 | 2 |
| | 24P | No | 6 | 3 | 3 | 2 |
| | | CONDITION | 6×749 > 4000 | 3×749 > 2000 | 3×749 > 1837.5 | 2×749 > 1333.33 |
| | | Na | 6 | 3 | 3 | 2 |
| | 24/1.001P | No | 6 | 3 | 3 | 2 |
| | | CONDITION | 6×749 > 4004 | 3×749 > 2002 | 3×749 > 1765.764 | 2×749 > 1334.66 |
| | | Na | 6 | 3 | 3 | 2 |

FIG. 18

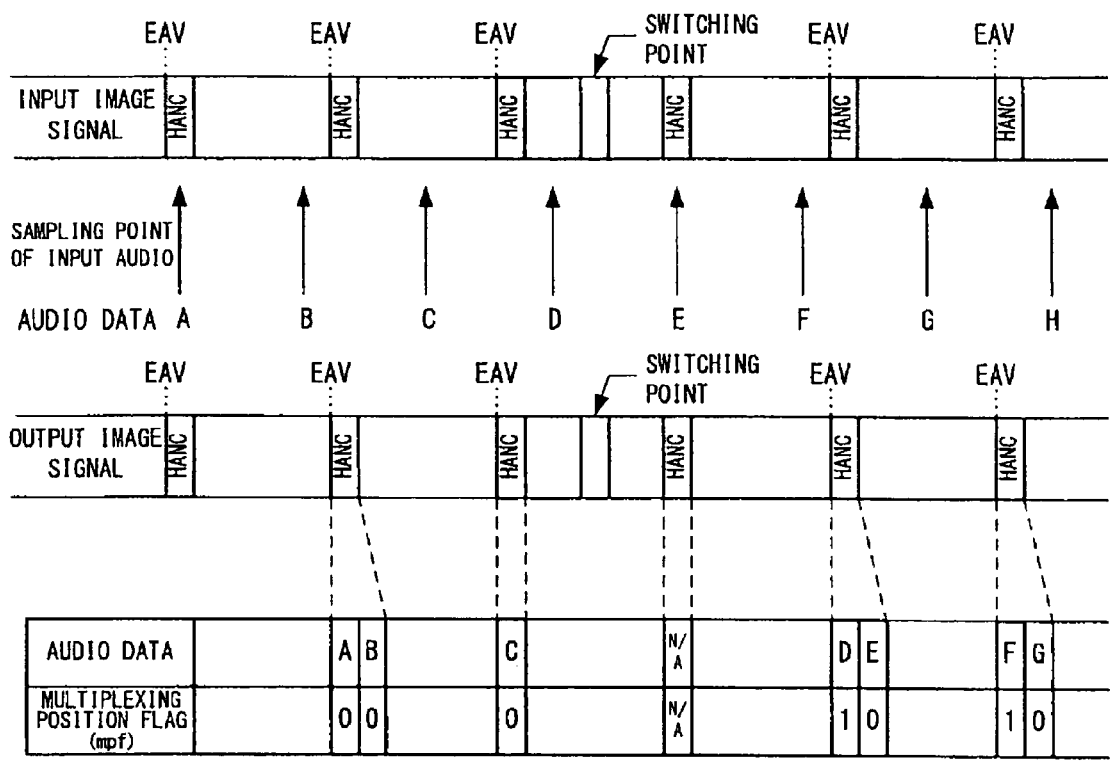

N. B.

1: FOR SAMPLES A, B, C, E, G, FOR EXAMPLE, SINCE ANCILLARY DATA PACKETS ARE MULTIPLEXED IN HORIZONTAL ANCILLARY DATA SPACE OF NEXT LINE FOLLOWING INPUT TIMING OF AUDIO SAMPLE, mpf=0 IS SET 2: N/A (NOT AVAILABLE) INDICATES THAT MULTIPLEXING OF ANCILLARY DATA PACKETS IS PROHIBITED ON LINE FOLLOWING SWITCHING POINT 3: FOR SAMPLES D, F, SINCE THE ANCILLARY DATA PACKETS ARE MULTIPLEXED IN HORIZONTAL ANCILLARY DATA SPACE OF SECOND LINE AFTER INPUT TIMING OF AUDIO SAMPLE, mpf=1 IS SET

FIG. 19

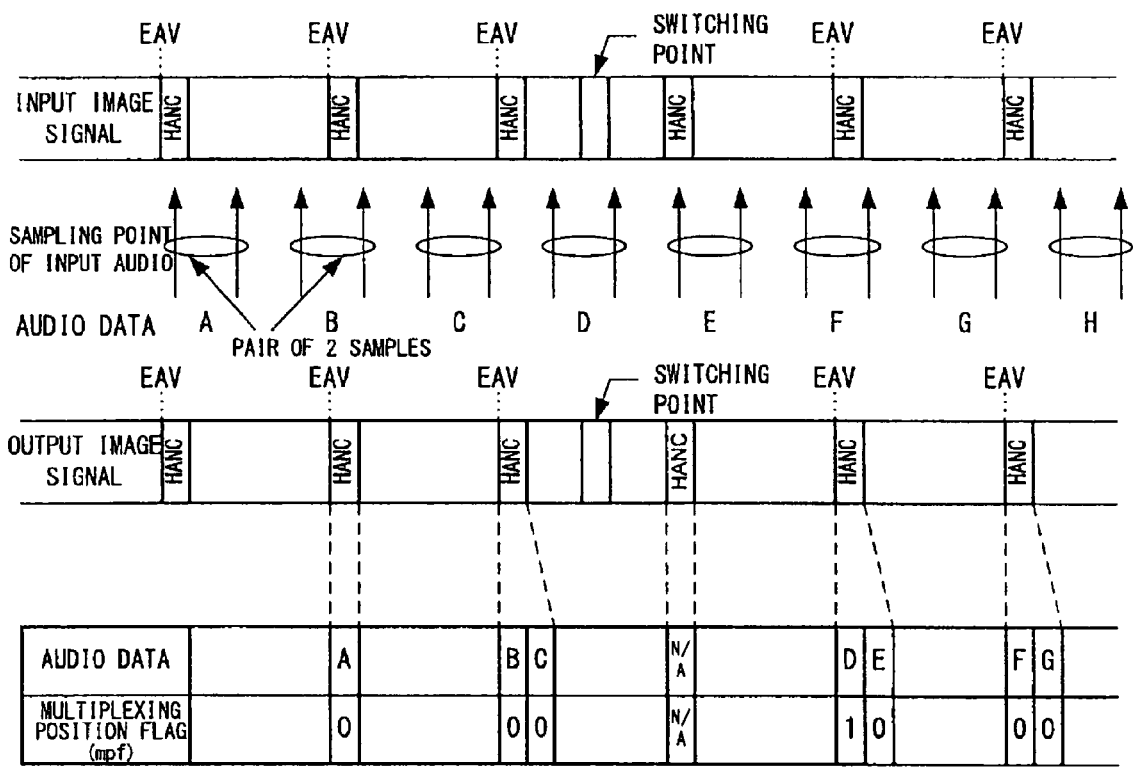

N. B.

1: FOR SAMPLES A, B, C, E, G, FOR EXAMPLE, SINCE ANCILLARY DATA PACKETS ARE MULTIPLEXED IN HORIZONTAL ANCILLARY DATA SPACE OF NEXT LINE FOLLOWING INPUT TIMING OF AUDIO SAMPLE, mpf=0 IS SET 2: N/A (NOT AVAILABLE) INDICATES THAT MULTIPLEXING OF ANCILLARY DATA PACKETS IS PROHIBITED ON LINE FOLLOWING SWITCHING POINT 3: FOR SAMPLES D SINCE THE ANCILLARY DATA PACKETS ARE MULTIPLEXED IN HORIZONTAL ANCILLARY DATA SPACE OF SECOND LINE AFTER INPUT TIMING OF AUDIO SAMPLE, mpf=1 IS SET R'G'B' or Y'C$^{b'}$C$^{r'}$ 4:4:4 SYSTEM Y'C$^{b'}$C$^{r'}$ 4:2:2 SYSTEM ▊ R' or C$^{r'}$ COMPONENT
▩ G' or Y' COMPONENT
▯ B' or C$^{b'}$ COMPONENT

SIGNAL TRANSMISSION APPARATUS AND SIGNAL TRANSMISSION METHOD

BACKGROUND OF THE INVENTION

1. Field of the Invention

The present invention relates to a signal transmission apparatus and method for serially transferring an image signal where the number of pixels in one frame exceeds the number of pixels defined by a HD-SDI format and a multi-channel audio signal in synchronization with the image signal.

2. Description of the Related Art

A image receiving system and an image pickup system for a super-high resolution image signal (video signal) with a higher resolution than a current HD (High Definition) image signal where one frame has 1920 samples on 1080 lines are being developed. As an example, the UHDTV (Ultra High Definition Television) format, which is a next-generation broadcast method with four or sixteen times the number of pixels of the current HD standard, has been proposed to the ITU (International Telecommunication Union) and the SMPTE (Society of Motion Picture and Television Engineers) and is in the process of becoming accepted as a standard. The image formats proposed to the ITU and the SMPTE are the ones for image signals where one frame has 3840 samples on 2160 lines or 7680 samples on 4320 lines, which is to say, double and four times the number of samples and lines of an image signal where one frame has 1920 samples on 1080 lines. Out of such formats, the format standardized by the ITU is called "LSDI" (Large Screen Digital Imagery) and the format proposed to the SMPTE is called "UHDTV" (Ultra High Definition TV). The signals defined by UHDTV are shown in Table 1 below.

TABLE 1

| System Category | System Name | Luminance or No. of R'G'B' samples per effective line | No. of effective lines per frame | Frame Rate (Hz) |
| --- | --- | --- | --- | --- |
| UHDTV1 | 3840 × 2160/50/P | 3840 | 2160 | 50 |
| | 3840 × 2160/59.94/P | 3840 | 2160 | 60/1.001 |
| | 3840 × 2160/60/P | 3840 | 2160 | 60 |
| UHDTV2 | 7680 × 4320/50/P | 7680 | 4320 | 50 |
| | 7680 × 4320/59.94/P | 7680 | 4320 | 60/1.001 |
| | 7680 × 4320/60/P | 7680 | 4320 | 60 |

As the method for transferring such signals, a method has been proposed that transfers an image signal with 3840 samples and 60 frames per second according to the UHDTV standard using two channels of a transfer path ("Mode D") with a bit rate of 10Gbps, and a method has been proposed that transfers an image signal with 7680 samples and 60 frames per second using eight channels of a transfer path ("Mode D") with a bit rate of 10Gbps.

Meanwhile, SMPTE 435-2 discloses how a basic data stream for one line of a frame, which is a 10-bit parallel data stream defined by SMPTE 292, is mapped onto a transfer path with a bit rate of 10.692 Gbps. Normally, the fields of the basic data stream are constructed in order of an EAV (End of Active video), a horizontal ancillary data space (also referred to as "HANC data" or a "horizontal blanking interval"), a SAV (Start of Active Video), and image data.

One example of a method of multiplexing data included in basic data streams on multiple channels will now be described with reference to FIGS. 1 to 4. Such methods of multiplexing data are defined as "Mode A", "Mode B", "Mode C", and "Mode D" in SMPTE 435-2.

FIG. 1 is a diagram useful in explaining "Mode A".

Mode A is a method of multiplexing basic data streams on five channels (CH1 to CH5). The data of the respective channels (the horizontal ancillary data space and image data region) is subjected to eight-bit/ten-bit conversion so as to be encoded into five-word (50-bit) data blocks. The 50-bit data blocks are then multiplexed in order of the channels onto one 10.692 Gbps stream.

FIG. 2 is a diagram useful in explaining "Mode B".

Mode B is a method of multiplexing basic data streams on six channels (CH1 to CH6).

In Mode B, data is multiplexed into a 10.692 Gbps stream for image data regions and a 10.692 Gbps stream for horizontal ancillary data spaces. Four-word (40-bit) image/EAV/SAV data included in the basic data streams of the six channels (CH1 to CH6) are subjected to eight-bit/ten-bit conversion, and such data is encoded into five-word (i.e., 50-bit) data blocks. The data blocks are then multiplexed in order of the channels onto the 10.692 Gbps stream for image data regions. On the other hand, the horizontal ancillary data spaces of the basic data streams of the four channels CH1 to CH4 are subjected to eight-bit/ten-bit conversion so as to be encoded into 50-bit data blocks and are multiplexed in order of the channels into the 10.692 Gbps stream for horizontal ancillary data spaces. However, the horizontal ancillary data spaces of the basic data streams on CH5 and CH6 are not transferred.

FIG. 3 is a diagram useful in explaining "Mode C".

Mode C is a method of multiplexing basic data streams on eight channels (CH1 to CH8).

In Mode C, data is multiplexed into a 10.692 Gbps stream for image data regions and a 10.692 Gbps stream for horizontal ancillary data spaces. When doing so, the image/EAV/SAV data of basic data streams on the CH1, CH3, CH5, and CH7 is extracted in 40-bit units, and the image/EAV/SAV data of the basic data streams on CH2, CH4, CH6, and CH8 is extracted in 32-bit units. Combining such data produces 72-bit data. A 40-bit data block of an odd-numbered channel is assigned to a 40-bit data block in the former half of a 72-bit data block. A 32-bit data block of an even-numbered channel is assigned to a 32-bit data block in the latter half of a 72-bit data block. This means that in one data block, data are multiplexed in the order CH1, CH2, for example. The 72-bit data block is then subjected to eight-bit/ten-bit conversion to produce nine-word (90-bit) data. The encoded nine-word (90-bit) data is multiplexed into the 10.692 Gbps stream for image data regions.

On the other hand, a horizontal ancillary data space of the CH1 basic data stream is subjected to eight-bit/ten-bit conversion to encode the data to a 50-bit data block. Such data is multiplexed into the 10.692 Gbps stream for horizontal ancillary data spaces. However, the horizontal ancillary data spaces of the CH2 to CH8 basic data streams are not transferred.

FIG. 4 is a diagram useful in explaining "Mode D".

Mode D is a method of multiplexing basic data streams on eight channels (CH1 to CH8).

In Mode D, data is multiplexed into a 10.692 Gbps stream for image data regions and a 10.692 Gbps stream for horizontal ancillary data spaces. When doing so, the image/EAV/SAV data of basic data streams on CH1, CH3, CH5, and CH7 is extracted in 40-bit units and then scrambled to produce 40-bit data. On the other hand, the image/EAV/SAV data of basic data streams on CH2, CH4, CH6, and CH8 is extracted in 32-bit units and subjected to eight-bit/ten-bit conversion to produce 40-bit data. Combining such data produces 80-bit data. The encoded eight-word (80-bit) data is multiplexed into the 10.692 Gbps stream for image data regions. When doing so, a 40-bit data block produced by eight-bit/ten-bit conversion of an even-numbered channel is assigned to a 40-bit data block in the former half of an 80-bit data block. A 40-bit data block of an odd-numbered channel that has been scrambled is assigned to the 40-bit data block in the latter half. This means that in one data block, data are multiplexed in the order CH2, CH1, for example. The reason that the order is switched in this way is that a content ID for identifying the mode in use is included in the 40-bit data block for the even-numbered channel that has been subjected to eight-bit/ten-bit conversion.

On the other hand, the horizontal ancillary data space of the CH1 basic data stream is subjected to eight-bit/ten-bit conversion and encoded to a 50-bit data block. Such blocks are multiplexed onto the 10.692 Gbps stream for horizontal ancillary data spaces. However, the horizontal ancillary data spaces of the CH2 to CH8 basic data streams are not transferred.

Meanwhile, SMPTE 299M is a standard that defines the multiplexing of 48 kHz audio signals on a maximum of sixteen channels onto an HD-SDI horizontal ancillary data space. A 96 kHz audio data structure has also been defined by a revision of SMPTE 299M. At present, 96 kHz audio signals on a maximum of eight channels can be multiplexed onto an HD-SDI horizontal ancillary data space.

In Mode C and Mode D defined by the present SMPTE 435, out of the eight HD-SDI channels, only the HD-SDI horizontal ancillary data space included in CH1 is subjected to eight-bit/ten-bit conversion and data is multiplexed as described above. By using this method, a maximum of sixteen channels of 48 kHz audio or a maximum of eight channels of 96 kHz audio defined by SMPTE 299M can be multiplexed.

An example of assignment of a horizontal data space and image data to 10.692 Gbps streams according to Mode C will now be described with reference to FIG. 5.

FIG. 5 shows an example assignment of a horizontal ancillary data space and image data in Mode C.

The image data on CH1 to CH8 is divided into 90-bit data blocks and inserted into the 10.692 Gbps stream for image/EAV/SAV data shown in FIG. 3 and described above.

On the other hand, the horizontal ancillary data space of the basic data stream of CH1 is divided into 50-bit data blocks and inserted into the 10.692 Gbps stream for horizontal ancillary data spaces shown in FIG. 3 and described above.

Japanese Unexamined Patent Application Publication No. 2005-328494 discloses a technology for serially transferring a 3840×2160/30P, 30/1.001P/4:4:4/12-bit signal that is one type of a 4 k×2 k signal (i.e., a super-high resolution signal with 4 k samples on 2 k lines) at a bit rate of 10Gbps or above. Note that the expression "3840×2160/30P" refers to the "number of pixels in the horizontal direction"×"number of lines in the vertical direction"/"number of frames per second". Such notation is used throughout this specification. The notation "4:4:4" indicates the ratio "red signal R: green signal G: blue signal B" when a method that transfers primary color signals is used, and indicates the ratio "luminance signal Y: first color difference signal Cb: second color difference signal Cr" when a method that transfers color difference signals is used.

SUMMARY OF THE INVENTION

In the standards for super-high definition image signals, attempts are also being made to improve the audio quality of the audio signals. For a UHDTV application, for example, the transfer of audio that has been sampled at a sampling frequency of 96 kHz (hereinafter referred to as simply "96 kHz audio"), which is double the sampling frequency of the 48 kHz audio used for a current HDTV, is imagined. Also, a maximum of 24 channels are required as the audio signal channels.

However, with the present transfer technology, since only transfer at a bit rate of a maximum of around 10Gbps is possible on one channel even with a transfer method that uses optical fiber, which has the highest transfer rate, as the transfer path, the transfer rate is insufficient for a super-high definition image signal, and it is necessary to divide a super-high definition image signal into a plurality of channels to be transferred. Therefore, it becomes that audio signals are also transferred using any of the plurality of channels. Audio signals that are synchronized with an image signal need to be transferred with the same timing as the image signal, and processing that synchronizes the image signal and the audio signals is also necessary. However, to transfer the 96 kHz audio on a maximum of 24 channels described above in synchronization with image data that has been divided between multiple channels, there is the problem that some kind of synchronization processing is required and that the construction for doing so becomes complicated.

Here, multiplexing of data using Mode C and Mode D defined by the current SMPTE 435 is investigated below. With both Mode C and Mode D, out of the eight HD-SDI channels, the horizontal ancillary data space on CH1 only can be multiplexed. The horizontal ancillary data space of CH1 alone is insufficient for the audio data that can be transferred using Mode C or Mode D.

There is also demand to transfer sixteen channels of 96 kHz audio for a 4096/24P/4:4:4/12-bit signal defined by SMPTE 428-2. However, with Mode C or Mode D where the 4096/24P/4:4:4/12-bit signal is converted to a 3840/24P/4:4:4/12-bit signal, it is not possible to transfer sixteen channels of 96 kHz audio.

Also, with Mode C and Mode D where transfer of a 4096/24P signal or a 3840/24P, 25P, 30P signal is realized, it is possible to multiplex the horizontal ancillary data space of only one HD-SDI channel onto a 10Gbps signal. Also, only eight channels of 96 kHz audio can be multiplexed.

The present invention was conceived in view of the situation described above and aims to multiplex and transfer multichannel 96 kHz audio in any of Mode C or Mode D.

When transmitting an input image signal where a number of pixels in one frame exceeds a number of pixels defined by an HD-SDI format and an audio signal inputted in synchronization with the input image signal, each frame in the input image signal are divided into first, second, third and fourth subimages, respective pixel samples of the first, second, third and fourth subimages are mapped onto image data regions of two-channel HD-SDI signals, respectively, and the audio signal is mapped onto supplementary data regions included in horizontal ancillary data spaces of any of the two-channel the HD-SDI signals onto which the respective pixel samples of the first, second, third and fourth subimages are mapped, respectively. The pixel samples mapped onto the image data regions of the respective two-channel HD-SDI signals are mapped onto an image data region of a first transfer data stream and the audio signal mapped onto the supplemental data regions included in horizontal ancillary data spaces of any of the two-channel the HD-SDI signals is mapped onto a horizontal ancillary data space of a second transfer data stream, and then the first and second transfer data streams are output.

According to an embodiment of the present invention, it is possible to multiplex a multi-channel audio signal onto a transfer data stream. In addition, mapping is carried out so that the phase relationship between an image signal and an audio signal on a channel to which the audio signal is added is substantially the same phase relationship as that between the original input image signal and the input audio signal. As a result, the synchronization relationship between the image signal and the audio signal is maintained, a process that maintains the same synchronization phase across a plurality of channels is not required, and the construction for synchronization processing is simplified.

BRIEF DESCRIPTION OF THE DRAWINGS

FIG. 11 is a diagram useful in explaining one example of mapping the samples included in one frame of a 4 k×2 k signal onto first to fourth subimages;
FIG. 15 is a diagram showing an example calculation of Na;
FIG. 18 is a diagram showing an example of the relationship between multiplexing position flags and multiplexing positions of 48 kHz audio data packets;
FIG. 19 is a diagram showing an example of the relationship between multiplexing position flags and multiplexing positions of 96 kHz audio data packets.

DESCRIPTION OF THE PREFERRED EMBODIMENTS

A first embodiment of the present invention will now be described with reference to FIGS. 6 to 19.

Figure 6:
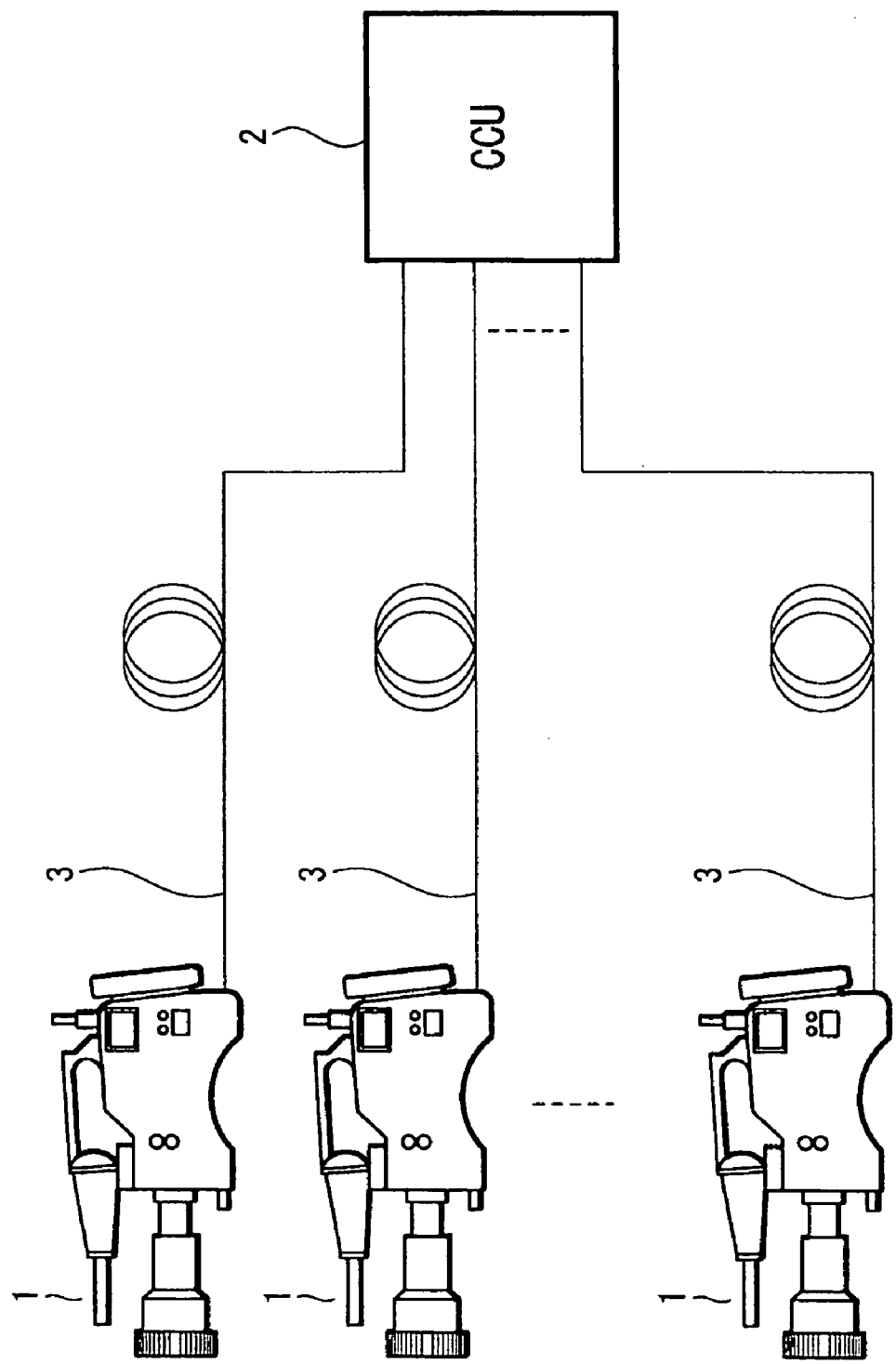
FIG. 6 is a diagram showing the overall construction of a camera transfer system for television broadcasting according to a first embodiment of the present invention.

FIG. 6 is a diagram showing the overall construction of an image transfer system for television broadcasting according to an embodiment of the present invention. This image transfer system is constructed of a plurality of broadcasting cameras 1 and a CCU (camera control unit) 2, with the respective broadcasting cameras 1 being connected to the CCU 2 by fiber optic cables 3.

The broadcasting cameras 1 have the same construction, and each functions as a signal transmitting apparatus that generates and transmits, as a 4 k×2 k signal (a super-high resolution signal with 4 k samples on 2 k lines), a 4096×2160/24P/4:4:4/12-bit signal for Digital Cinema.

The CCU 2 is a unit that controls the broadcasting cameras 1, receives image signals from the respective broadcasting cameras 1, and transmits an image signal ("return video") for displaying images being picked up by another broadcasting camera 1 on the monitor of each broadcasting camera 1. The CCU 2 functions as a signal receiving apparatus that receives image signals from the broadcasting cameras 1.

Figure 7:
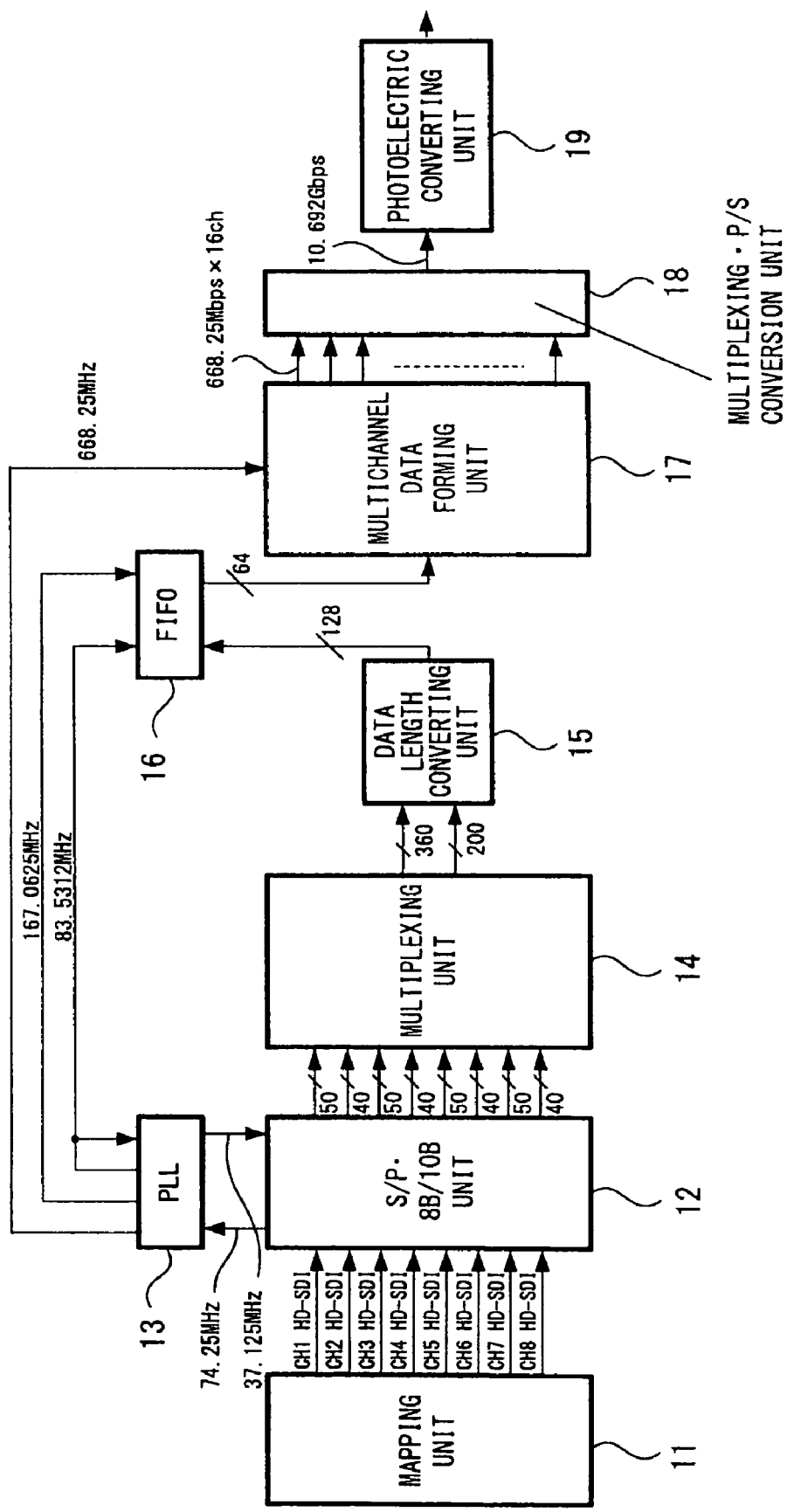
FIG. 7 is a block diagram showing an example of the internal construction of a signal transmitting apparatus out of the circuit construction of a broadcasting camera.

FIG. 7 is a block diagram showing a signal transmission apparatus 5 that relates to the present embodiment out of the circuit construction of each broadcasting camera 1. A 4096×2160/24P/4:4:4/12-bit signal that has been generated by an image pickup unit and an image signal processing unit (not shown) inside the broadcasting camera 1 is input to a mapping unit 11.

The 4096×2160/24P/4:4:4/12-bit signal is a 36 bits wide signal in which a G data series, a B data series and an R data series that are each 12 bits in word length are synchronized and aligned in parallel. One frame period is ¹⁄₂₄s, and 2160 effective line periods are included in one frame period. In the input image signal, the number of pixels in one frame exceeds the number of pixels defined by the HD-SDI format. Audio signals are inputted to the mapping unit 11 in synchronization with the input image signal.

A timing reference signal EAV (End of Active Video), a line number LN, an error detection code (CRC), a horizontal ancillary data space (a period for ancillary data and undefined word data), a timing reference signal SAV (Start of Active Video), and "active line" that is a period for actual image data are disposed in each effective line period. The number of samples on an active line is 4,096, and G, B, and R image data are respectively disposed on the active lines of the G data series, the B data series, and the R data series.

Figure 8A:
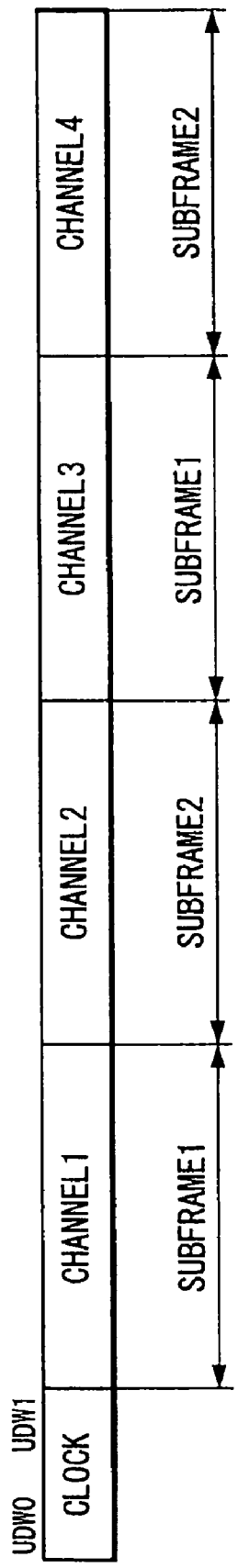
FIGS. 8A and 8B are diagrams showing examples of audio data packets.
Figure 8B:
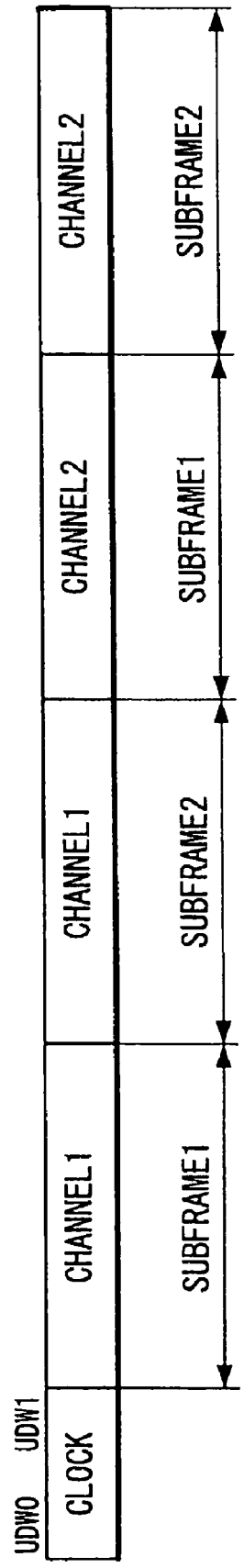

FIGS. 8A and 8B are diagrams showing a part of an example composition of an audio data packet for a case where audio data sampled at a predetermined sampling frequency is sent in subframes 1, 2 as defined by AES3-2003, which is a serial interface standard for digital audio. The data structure of an audio data packet is determined by SMPTE 299M.

FIG. 8A is an example of an audio data packet for a case where audio that has been sampled at a sampling frequency of 48 kHz (hereinafter referred to as "48 kHz audio") is sent in subframes 1 and 2. This audio data packet is composed of a clock region that includes a two-word user data word (UDW) and CH1 to CH4 that each includes a four-word UDW.

FIG. 8B is an example of an audio data packet for a case where audio that has been sampled at a sampling frequency of 96 kHz (hereinafter referred to as "96 kHz audio") is sent in subframes 1 and 2. This audio data packet is composed of a clock region that includes a two-word user data word (UDW) and CH1, CH1, CH2, CH2 that each includes a four-word UDW.

Audio clock phase data is inserted into the clock region as shown in Table 2 below. The audio clock phase data is a value that shows where the audio has been generated. The audio sample positions, which are given by sampling at a predetermined sampling clock, are defined by 74.25 MHz sample positions in one horizontal interval (the horizontal ancillary data space, SAV, image data region, and EAV) in each frame. The audio data packets are multiplexed in the horizontal ancillary data space by a formatter.

TABLE 2

| Bit Number | UDW0 | UDW1 |
|---|---|---|
| b9 (MSB) | Inverse of b8 | Inverse of b8 |
| b8 | Even-numbered parity[1] | Even-numbered parity[1] |
| b7 | Ck7 audio clock phase data | 0 |
| b6 | Ck6 audio clock phase data | 0 |
| b5 | Ck5 audio clock phase data | ck12 audio clock phase data (MSB) |
| b4 | Ck4 audio clock phase data | Mpf multiplexing position flag |
| b3 | Ck3 audio clock phase data | ck11 audio clock phase data |
| b2 | Ck2 audio clock phase data | ck10 audio clock phase data |
| b1 | Ck1 audio clock phase data | ck9 audio clock phase data |
| b0 (LSB) | ck0 audio clock phase data (LSB) | ck8 audio clock phase data |

[1]Even-numbered parity from b0 to b7

The audio clock phase data is determined by 13 bits numbered ck0 to ck12. The bits from ck0 to ck12 indicate the number of image clock cycles between (i) the image sample inputted at the same time as the audio sample was inputted into the formatter and (ii) the first word of the EAV of the image stream. In a system that uses a 74.25 MHz sampling clock according to SMPTE 292M, ck0 to ck12 can manage the audio phase in one horizontal interval of each frame in which audio samples sampled at a predetermined sampling clock have been inserted, for a maximum of 8,192 clock cycles.

Figure 2:
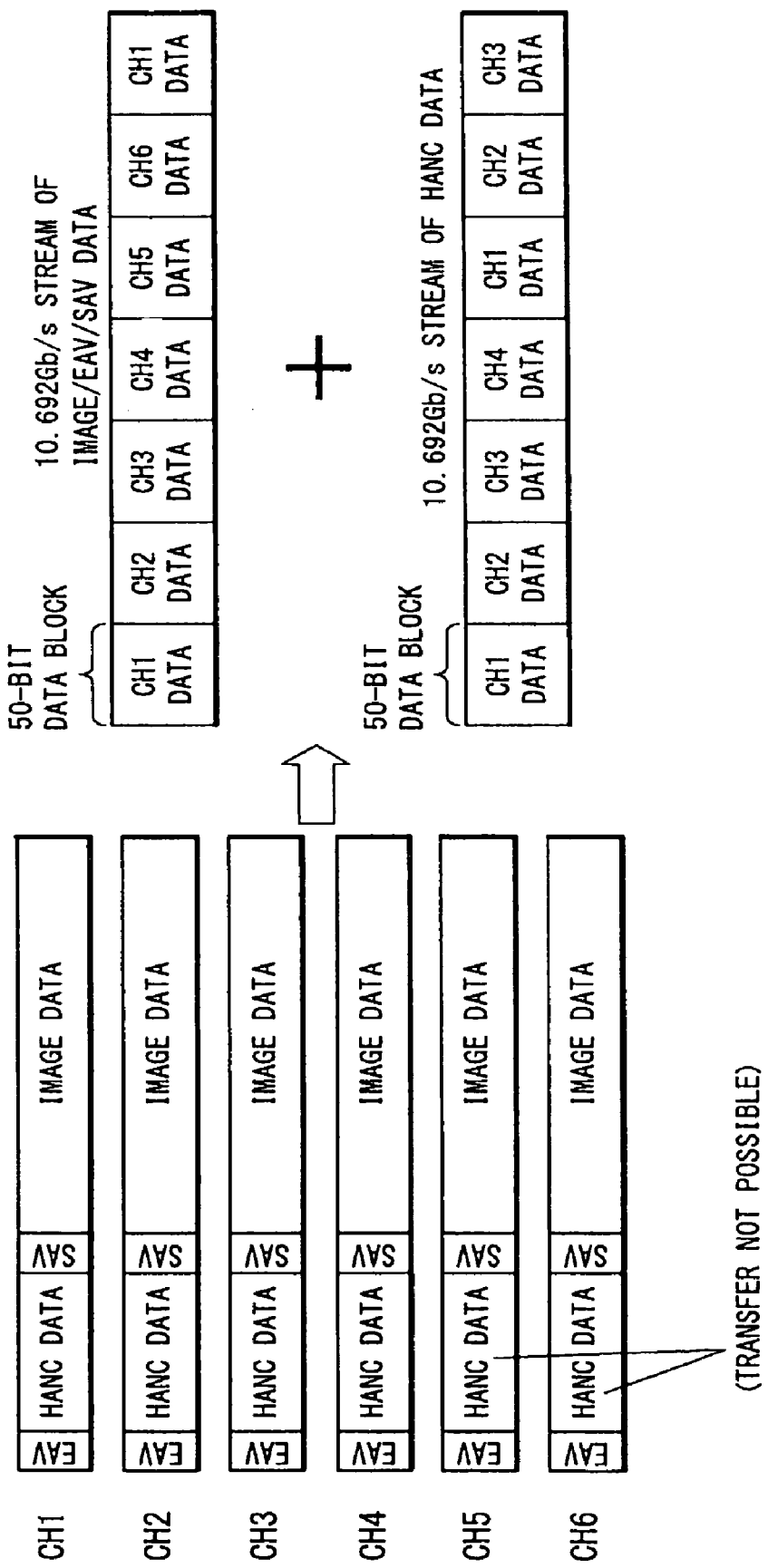
FIG. 2 is a diagram showing an example of Mode B.

The subframe format is determined by FIG. 2 of AES3-2003 that is a serial interface standard for digital audio. Also, as the frame format, in two-channel mode, it is defined that two channels of 48 kHz audio are sent in consecutive subframes 1, 2. Also, SMPTE 299M defines that 48 kHz audio is inserted into Channels 1, 2.

In the past, as shown in FIG. 8A, Channel 1 of the audio packet was sent in subframe 1 and Channel 2 was sent in subframe 2. In addition, Channel 3 was sent in subframe 1 and Channel 4 was sent in subframe 2.

In the present embodiment, to achieve compatibility with a receiving side device when transferring signals, the signal transmission apparatus 5 inserts consecutive samples on Channel 1 of 96 kHz audio into subframes 1 and 2. It is also defined that consecutive samples on Channel 2 of 96 kHz audio are inserted into subframes 1 and 2. That is, as shown in FIG. 8B, out of the samples that are consecutive on one channel of 96 kHz audio, Channel 1 is sent in consecutive subframes 1, 2. Channel 2 is then sent in consecutive subframes 1, 2.

In the present embodiment, data is transferred using a multiplexing method according to Mode C (4096×2160/24P/4:4:4/12-bit) defined in SMPTE 435.

First, in the mapping unit 11, the 4096×2160/24P/4:4:4/12-bit signal is mapped onto transfer streams on eight channels as defined by HD-SDI format.

An example composition of one line of 10.692 Gbps serial data as defined by HD-SDI format will be now be described with reference to FIG. 9.

Figure 9:
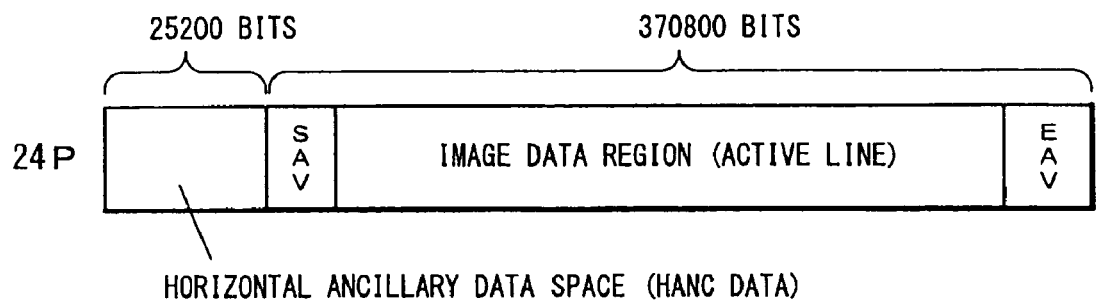
FIG. 9 is a diagram showing the construction of one line of 10.692 Gbps serial digital data.

FIG. 9 shows one example of the data structure of one line of 10.692 Gbps serial digital data in the case of 24P.

In FIG. 9, data including a line number LN and an error detection code CRC is shown as "SAV, image data region (active line), EAV", and data including a region of auxiliary data is shown as "horizontal ancillary data space (HANC data)".

Figure 5:
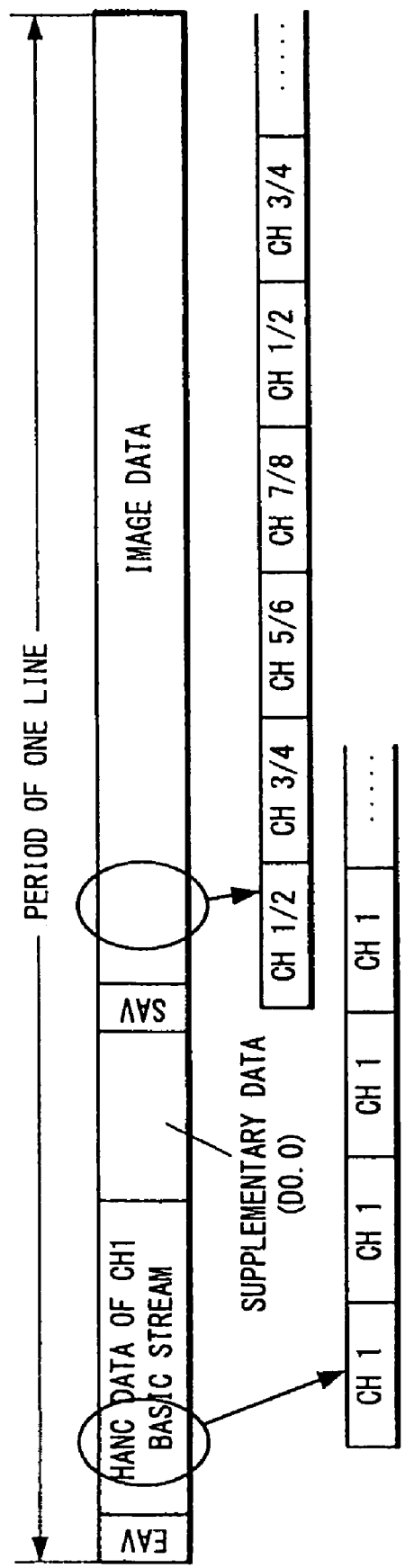
FIG. 5 is a diagram showing an example assignment of data in Mode C.

The horizontal ancillary data space also includes a supplementary data region as shown in FIG. 5. Audio signals are mapped onto this supplementary data region.

Figure 10:
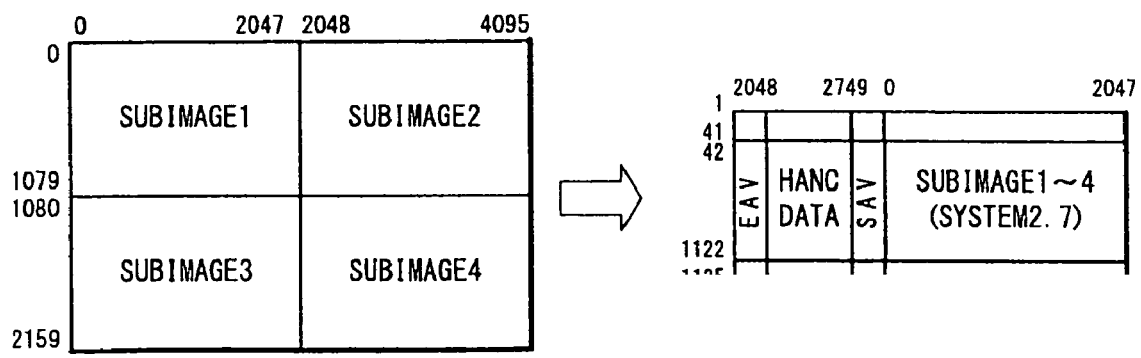
FIG. 10 is a diagram useful in explaining one example of mapping the samples included in one frame of a 4 k×2 k signal onto first to fourth subimages.

FIG. 10 is a diagram showing an example of how pixel samples included in one frame are mapped onto first to fourth subimages.

The mapping unit 11 divides one frame (one screen) into four (subimages 1 through 4) to map the 4096×2160/24P/4:4:4/12-bit signal onto 2048×1080/24P/4:4:4/12-bit signals on four channels. The pixel samples of each subframe are mapped onto image data regions included in HD-SDI signals on two channels.

The data regions of two-channel HD-SDI signals into which the pixel samples of the first to fourth subimages are respectively mapped are set by the 2048×1080/24P/4:4:4/12-bit signals. The mapping unit 11 maps audio signals onto the supplementary data region included in the horizontal ancillary data space of one of the two-channel HD-SDI signals into which the first, second, third, and fourth subimages are respectively mapped. At this time, if the supplementary data region of one channel out of the two channels of the two-channel HD-SDI signal to which the audio signals with a sampling frequency of 48 kHz or 96 kHz are mapped is not sufficient, the mapping unit 11 maps the audio signals onto the supplementary data region of the other channel of the two channels. The mapping unit 11 according to the present embodiment is characterized by multiplexing a multi-channel audio onto the horizontal ancillary data spaces of basic data streams HD-SDI signals in which audio signals are mapped.

FIG. 11 is a diagram showing one example where the first to fourth subimages (2048×1080/24P/4:4:4/12-bit signals) onto which the pixel samples of one frame have been mapped are respectively mapped onto LinkA and LinkB in accordance with the provisions of SMPTE 372M.

Figure 3:
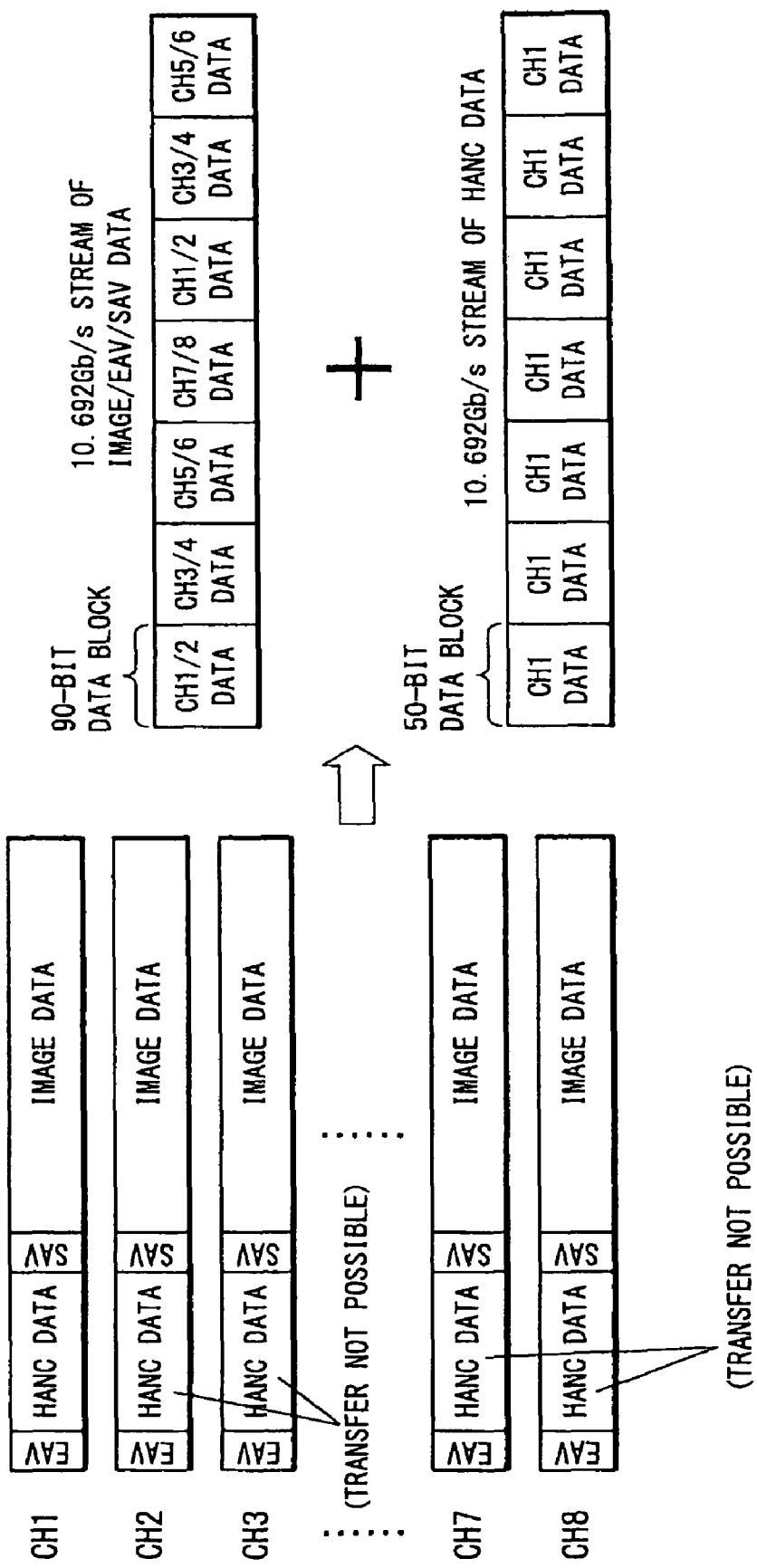
FIG. 3 is a diagram showing an example of Mode C.
Figure 4:
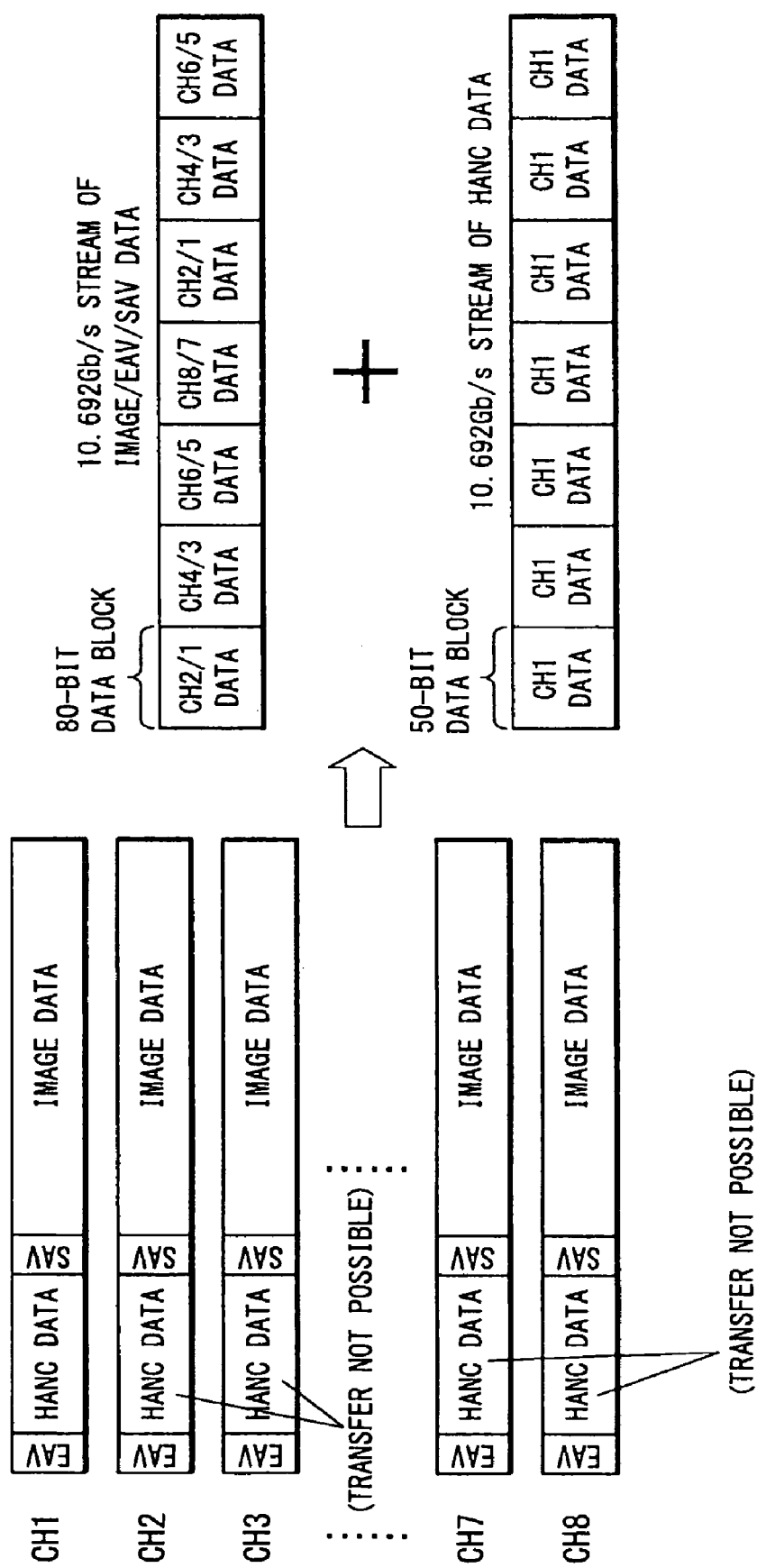
FIG. 4 is a diagram showing an example of Mode D.

SMPTE 435 is a standard for a 10G interface that encodes a multichannel HD-SDI signal in two-sample (i.e., forty-bit) units according to eight-bit/ten-bit conversion to convert 40-bit data to 50-bit data, multiplexes the 50-bit data on the respective channels, and serially transfers the resulting signals at a bitrate of 10.692 Gbps or 10.692 Gbps/1.001 (hereinafter such bitrates are collectively referred to as "10.692 Gbps"). A technique for mapping a 4 k×2 k signal onto HD-SDI signals is shown in FIG. 3 and FIG. 4 in "5.4 Octa Link 1.5 Gbps Class" of "SMPTE 435 Part 1".

As shown in FIG. 11, CH1 (LinkA) and CH2 (LinkB), CH3 (LinkA) and CH4 (LinkB), CH5 (LinkA) and CH6 (LinkB), and CH7 (LinkA) and CH8 (LinkB) according to SMPTE 372M ("Dual Link") are respectively formed from the first to fourth subimages set by 2048×1080/24P/4:4:4/12-bit signals.

Thus, by mapping the first to fourth subimages onto dual-link HD-SDI signals, respectively, eight channels of HD-SDI signals are generated. In the present embodiment, since the horizontal blanking signals of CH1 and CH3 are transferred, it is possible to multiplex and transfer audio in the horizontal ancillary data spaces of CH1 and CH3.

Figure 1:
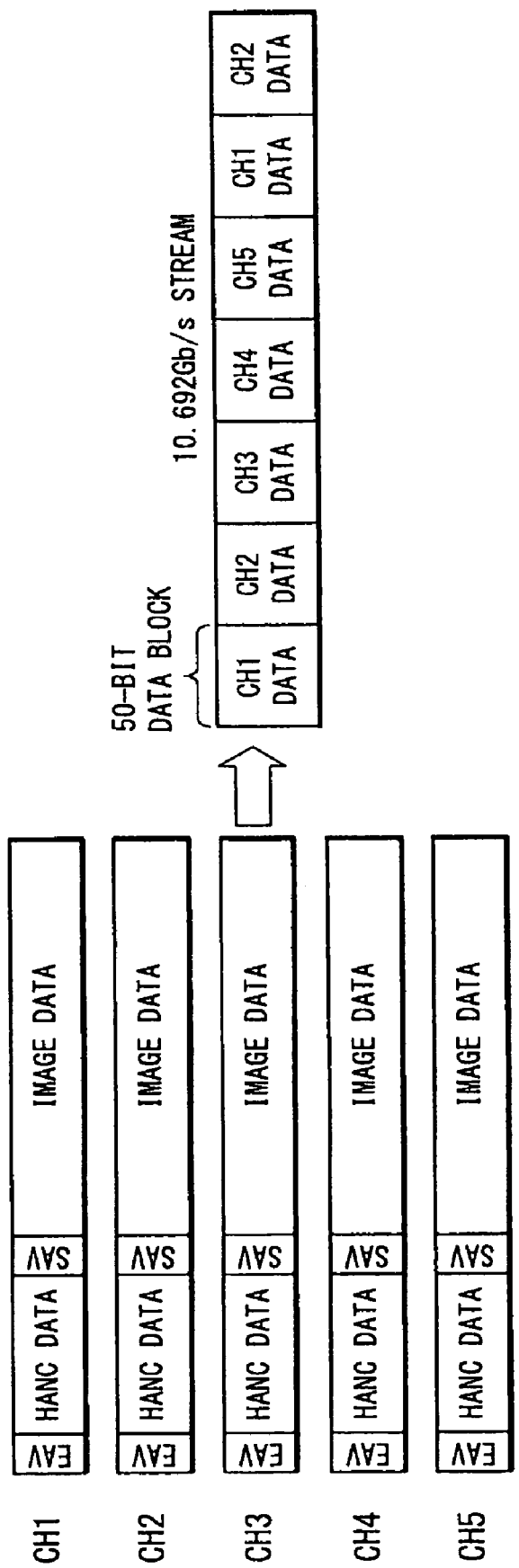
FIG. 1 is a diagram showing an example of Mode A.

SMPTE 299M defines that it is possible to transfer a maximum of sixteen channels of 48 kHz audio in an HD-SDI horizontal ancillary data space. In the present embodiment, when transferring 96 kHz audio, Channel 1 of the 96 kHz audio is transferred using the two channels, Channel 1 and Channel 2, of AES data stream 1 for 48 kHz audio as defined in FIG. 1 of SMPTE 299M. In the same way, using the two channels, Channel 1 and Channel 2, of the AES data stream 2 for 48 kHz audio, Channel 2 of the 96 kHz audio is transferred. According to such provisions, a maximum of eight channels can be transferred.

The audio phase is determined in accordance with SMPTE 299M. That is, the audio phase is determined by defining phase information from the EAV in one horizontal period of a 4096/24P signal in a formatter using the phase of a 74.25 MHz clock produced by dividing a 4096/24P sampling clock (which corresponds to 297 MHz) into four.

Here, comparing a 1920/24P signal and a 4096/24P signal, the period of two lines of the 4096/24P signal corresponds to the period of one line of the 1920/24P signal. The audio clock phase data is 13 bits long (ck0 to ck12), and since a maximum of 8192 clocks can be set, it is possible to set the audio phase for a period equivalent to eight lines. That is, by using existing audio clock phase data, it is possible to manage the phase on the equivalent of two lines or more of the 4096/24P signal.

The mapping unit 11 maps 2048×1080/24P/4:4:4/12-bit signals in HD-SDI image data regions. Since it is possible to map respective samples of four subimages produced by the division of one frame into four onto 2048×1080/24P/4:4:4/12-bit signals on two channels, such samples can be transferred by the present dual link HD-SDI signals.

Figure 12A:
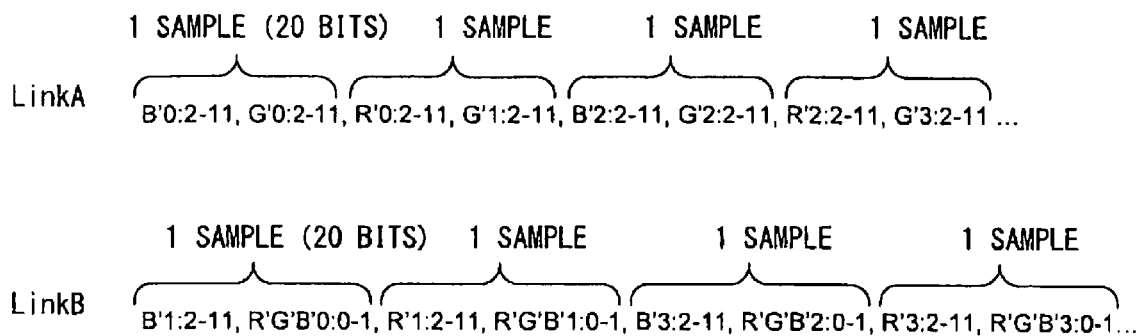
FIGS. 12A and 12B are diagrams schematically showing the data constructions of LinkA, LinkB according to SMPTE 372M.
Figure 12B:
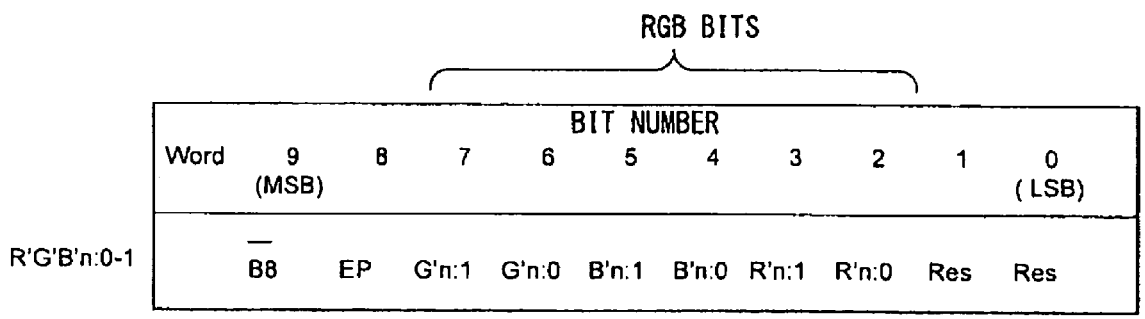

FIGS. 12A and 12B show the data structure of LinkA and LinkB according to SMPTE 372M.

As shown in FIG. 12A, on LinkA, one sample is expressed by twenty bits and every bit expresses an RGB value.

On LinkB also, one sample is expressed by twenty bits as shown in FIG. 12A, but as shown in FIG. 12B, out of the ten-bit R'G'B'n:0-1, only the six bits with the bit numbers 2 to 7 express an RGB value. Accordingly, on LinkB, the number of bits that express an RGB value in one sample is sixteen.

The HD-SDI signals on CH1 to CH8 that have been mapped by the mapping unit 11 are sent to an S/P·8B/10B unit 12 as shown in FIG. 7.

Figure 13:
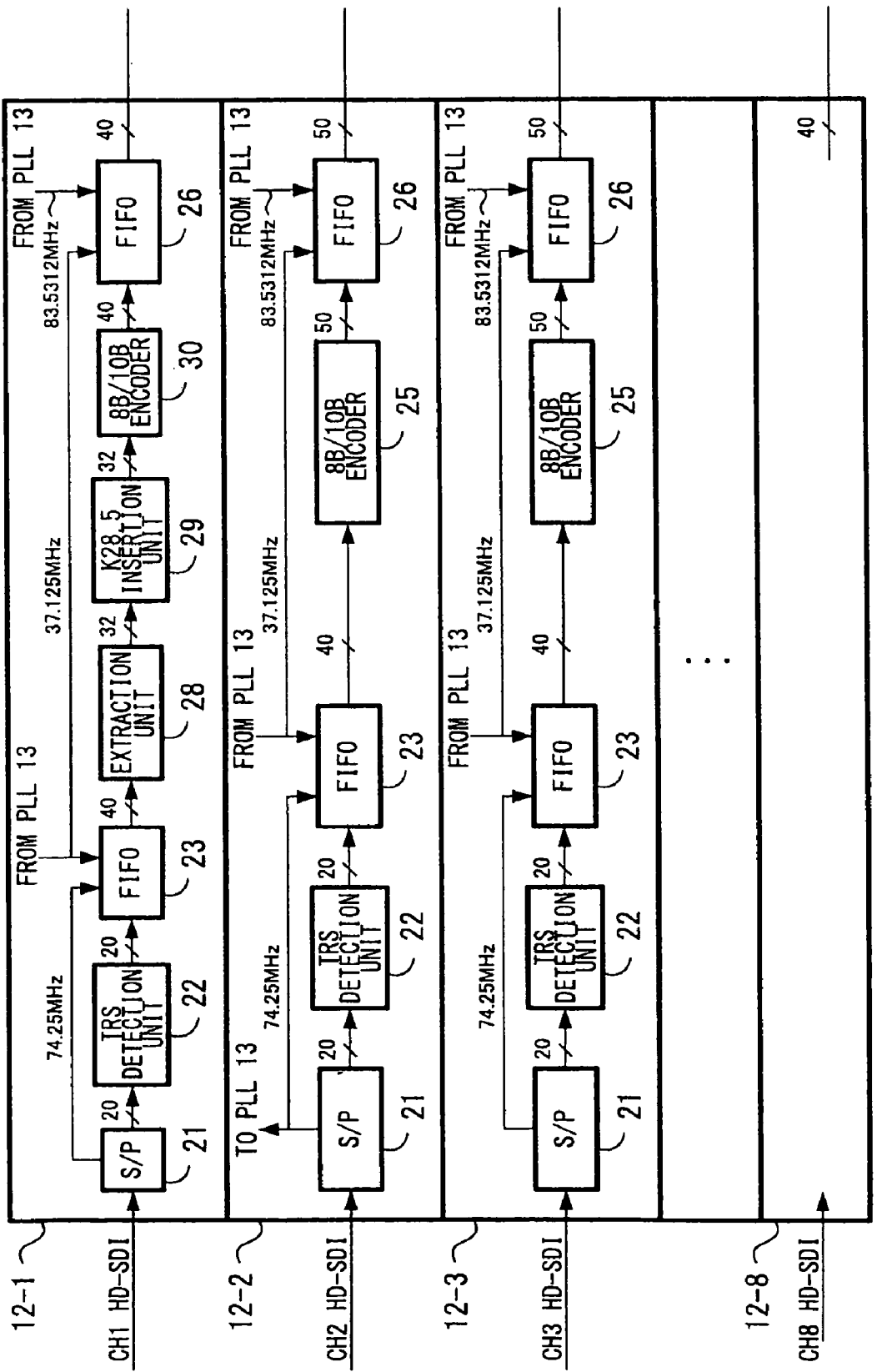
FIG. 13 is a block diagram showing the construction of an S/P·8B/10B unit 12.

FIG. 13 is a block diagram showing the construction of the S/P·8B/10B unit 12. The S/P·8B/10B unit 12 is composed of eight blocks 12-1 to 12-8 that one-to-one correspond to CH1 to CH8 HD-SDI signals.

The blocks 12-1, 12-3, 12-5, and 12-7 for CH1, CH3, CH5, and CH7 of LinkA have the same construction (the constructions of the blocks 12-1, 12-3 are shown in FIG. 13, but the constructions of the blocks 12-5, 12-7 are omitted). The blocks 12-2, 12-4, 12-6, and 12-8 for CH2, CH4, CH6, and CH8 of LinkB also have the same construction (the construction of the block 12-2 is shown in FIG. 13, but the constructions of the blocks 12-4, 12-6, 12-8 are omitted). Also, parts that carry out the same processing in the respective blocks have been assigned the same reference numerals.

First, the blocks 12-1, 12-3, 12-5, and 12-7 for LinkA will be described. In the blocks 12-1, 12-3, 12-5, and 12-7, the HD-SDI signals on CH1, CH3, CH5, and CH7 that have been inputted are sent to an S/P (serial/parallel) conversion unit 21. The S/P conversion unit 21 carries out serial to parallel conversion on the HD-SDI signal to produce 20-bit parallel digital data with a bit rate of 74.25 Mbps or 74.25 Mbps/1.001 (hereinafter simply designated as "74.25 Mbps") and extracts a 74.25 MHz clock.

Parallel data produced by the serial to parallel conversion by the S/P conversion unit 21 is sent to a TRS detection unit 22. The 74.25 MHz clock extracted by the S/P conversion unit 21 is sent to a FIFO memory 23 as a write clock. The 74.25 MHz clock extracted by the S/P conversion unit 21 inside the block 12-1 is also sent to a PLL (Phase Locked Loop) 13 shown in FIG. 7.

The TRS detection unit 22 detects the timing reference signal SAV and EAV from the parallel digital data sent from the S/P conversion unit 21 and establishes word synchronization based on the detection result.

The parallel digital data that has been subjected to processing by the TRS detection unit 22 is sent to the FIFO memory 23 and is written into the FIFO memory 23 using the 74.25 MHz clock from the S/P conversion unit 21.

The PLL 13 in FIG. 7 sends a 37.125 MHz clock produced by dividing the 74.25 MHz clock from the S/P conversion unit 21 inside the block 12-1 by two to a FIFO memory 23 in each of the blocks 12-1 to 12-8 as a read clock and also sends such clock to a FIFO memory 26 inside each of the blocks 12-1 to 12-8 as a write clock.

The PLL 13 sends a 83.5312 MHz clock produced by multiplying the frequency of the 74.25 MHz clock from the S/P conversion unit 21 inside the block 12-1 by 9/8 to the FIFO memories 26 inside the blocks 12-1 to 12-8 as a read clock and to a FIFO memory 16 in FIG. 7 as a write clock.

The PLL 13 also sends a 167.0625 MHz clock produced by multiplying the frequency of the 74.25 MHz clock from the S/P conversion unit 21 inside the block 12-1 by 9/4 to the FIFO memory 16 in FIG. 7 as a read clock.

The PLL 13 also sends a 668.25 MHz clock produced by multiplying the frequency of the 74.25 MHz clock from the S/P conversion unit 21 inside the block 12-1 by 9 to a multi-channel data forming unit 17 in FIG. 7 as a read clock.

The 20-bit parallel digital data written using the 74.25 MHz clock from the S/P conversion unit 21 is read from the FIFO memory 23 in two sample units as 40-bit parallel digital data using the 37.125 MHz clock from the PLL 13 shown in FIG. 7, and is sent to an extraction unit 28.

The extraction unit 28 is a circuit that extracts RGB bits from only data of the timing reference signal SAV, the active line, the timing reference signal EAV, the line number LN, and the error detection code CRC out of the data on each horizontal line of LinkA. That is, the extraction unit 28 extracts the 16 bits that express RGB values out of the 20 bits in one sample on LinkA shown in FIG. 12A.

The 16-bit parallel digital data extracted by the extraction unit 28 is read out in two-sample units as 32-bit parallel digital data and sent to a K28.5 insertion unit 29.

The K28.5 insertion unit 29 inserts two eight-bit word data into a starting part of the timing reference signal SAV or EAV. When subjected to eight-bit/ten-bit conversion, this eight-bit word data is converted to ten-bit word data (referred to by the code name "K28.5") that is not used as word data that expresses an image signal. In Mode C, K28.5 is inserted on CH1 (LinkA).

The 32-bit parallel digital data that has been processed by the K28.5 insertion unit 29 is sent to an 8B/10B encoder 30. The 8B/10B encoder 30 subjects the 32-bit parallel digital data to 8-bit/10-bit conversion and outputs the result.

The 40-bit parallel digital data produced by 8-bit/10-bit conversion by the 8B/10B encoder 30 is written into the FIFO memory 26 using the 37.125 MHz clock from the PLL 13 shown in FIG. 7 and is then read out from the FIFO memory 26 as 40-bit data using the 83.5312 MHz clock from the PLL 13 and sent to a multiplexing unit 14 shown in FIG. 7.

Next, the blocks 12-2, 12-4, 12-6, and 12-8 for LinkB will be described. In the blocks 12-2, 12-4, 12-6, and 12-8, the HD-SDI signals on CH2, CH4, CH6, and CH8 that have been inputted are subjected to the same processing by the S/P conversion unit 21 and the TRS detection unit 22 as in the blocks 12-1, 12-3, 12-5, and 12-7 and are then sent to an 8B/10B encoder 25 via the FIFO memory 23.

The 8B/10B encoder 25 in the block 12-2 subjects the data of the image data region and the horizontal ancillary data space out of the 40-bit parallel digital data read from the FIFO memory 23 to 8-bit/10-bit conversion.

The respective 8B/10B encoders 25 in the blocks 12-3, 12-5, and 12-7 subject the data in the image data region and the SAV/EAV/LN/CRC data spaces only out of the forty-bit parallel digital data read from the FIFO memory 23 to 8-bit/10-bit conversion.

The 50-bit parallel digital data that has been subjected to 8-bit/10-bit conversion by the 8B/10B encoder 25 is written into the FIFO memory 26 using the 37.125 MHz clock from the PLL 13 in FIG. 7 and then read out from the FIFO memory 26 as 50-bit data using the 83.5312 MHz clock from the PLL 13 and sent to the multiplexing unit 14 shown in FIG. 7.

The multiplexing unit 14 multiplexes the pixel samples mapped onto the image data regions of the eight channels and the audio signals that have been mapped on at least one channel out of such eight channels onto a 10.692 Gbps stream (transfer stream). When doing so, the multiplexing unit 14 aligns the 50-bit parallel digital data of CH1, CH3, CH5, and CH7 read out from the FIFO memories 26 inside the respective blocks 12-1 to 12-8 of the S/P·8B/10B unit 12 in the order shown in FIG. 14A. The multiplexing unit 14 also aligns the 40-bit parallel digital data (data of only the timing reference signal SAV, active line, timing reference signal EAV, line number LN and error detection code CRC) of CH2, CH4, CH6, and CH8 read out from the FIFO memories 26 inside the respective blocks 12-1 to 12-8 of the S/P·8B/10B unit 12 in the order shown in FIG. 14A. The data on CH1 to CH8 are multiplexed in order into 360-bit data.

The horizontal ancillary data space of a 10G interface has the same data structure as CH1 in the supplementary data (see FIG. 5). By multiplexing the HD-SDI horizontal ancillary data space of CH3 into the horizontal ancillary data space of the 10G interface, it is possible to multiplex a maximum of 32 channels of 48 kHz audio or a maximum of 16 channels of 96 kHz audio. According to this method, it is possible to transfer 16 channels of 96 kHz audio defined by SMPTE 428-2.

In the present embodiment, on CH1, CH3, CH5, and CH7, all of the active image period and the SAV/EAV/LN/CRC regions of each 74.25 MHz/20-bit HD-SDI signal produced by S/P conversion are transferred according to Mode C or Mode D.

On the other hand, on CH2, CH4, CH6, and CH8, out of the active image period and the SAV/EAV/LN/CRC regions of each 74.25 MHz/20-bit HD-SDI signal produced by S/P conversion, 16-bit data produced by extracting b2 to b7 of the Y channel is subjected to 8B/10B conversion and transferred.

Here, the amount of data in Mode C that can be transferred at 10Gbps is expressed in 10-bit/word units. As shown in Table 3, the supplementary data region is 795-word (7950 bits) long.

TABLE 3

| System number | Frame rate | Number of words per line | HANC/ EAV/SAV data | Image data | Supplementary data |
|---|---|---|---|---|---|
| 8.1 | 24 Hz | 39600 | 1941 | 36864 | 795 |

10 bits/word

Next, Table 4 is an example of an image sample construction and the frame rate of a UHDTV system. By referring to Table 4, the image format and the like can be known for the system number in Table 3.

TABLE 4

| System number | SMPTE/ITU standard | Screen format | Signal format Sampling structure | frame/ frame rate |
|---|---|---|---|---|
| 8.1 | 428-1 | 4096 × 2160 | 4:4:4 (X'Y'Z') 12 bit | 24 fps progressive |
| 8.2 | BT.1769 | 3840 × 2160 | 4:4:4 (Y'C'$_B$C'$_R$) 4:2:2 (Y'C'$_B$C'$_R$)/ 10 bit | 24, 25, 30 fps progressive 23.98 fps progressive |
| 8.3 | BT.1769 | 3840 × 2160 | 4:4:4 (R'G'B')/10 bit | 24, 25, 30 fps progressive 23.98 fps progressive |
| 8.4 | BT.1769 | 3840 × 2160 | 4:4:4 (Y'C'$_B$C'$_R$)/ 10 bit | 24, 25, 30 fps progressive 23.98 fps progressive |
| 8.5 | BT.1769 | 3840 × 2160 | 4:2:0 (Y'C'$_B$C'$_R$) 4:2:2 (Y'C'$_B$C'$_R$)/ 12 bit | 24, 25, 30 fps progressive 23.98 fps progressive |
| 8.6 | BT.1769 | 3840 × 2160 | 4:4:4 (R'G'B')/12 bit | 24, 25, 30 fps progressive 23.9 8 fps progressive |
| 8.7 | BT.1769 | 3840 × 2160 | 4:4:4 (Y'C'$_B$C'$_R$)/ 12 bit | 24, 25, 30 fps progressive 23.98 fps progressive |

The amount of data that can be stored in the horizontal ancillary data space of CH1 is calculated below. According to the subimage shown in FIG. 10, the image data region (2048 samples) and the SAV/EAV/LN/CRC region (12 samples) are subtracted from the unit data region (2750 samples that are one horizontal interval of 24P) as follows;

2750 samples (unit data region)−2048 samples (image data region)−12 samples (SAV/EAV/LN/CRC regions)=690 samples.

From this result, it can be understood that the data of 690 samples can be stored in the horizontal ancillary data space.

Next, the number of bits in the horizontal ancillary data space is calculated as follows (Note that one sample is 20 bits long);

690 samples×20 bits×10/8=17250 bits.

From Table 3, since the supplementary data region is 7950 bits and is shorter than the 17250 bits of the horizontal ancillary data space, it is not possible to multiplex all of the data in the horizontal ancillary data space of CH3.

Here, the number of samples that can be stored is calculated as below from the horizontal ancillary data space (17250 bits) found earlier and the region (7950 bits) of the supplementary data shown in Table 3;

(17250 bits+7950 bits)÷20 bits×8/10=1008 samples.

1008 samples÷2 channels=504 samples

In this way, it can be understood that the number of samples respectively assigned to CH1, CH3 is 504 samples. When assigning to CH1, CH3, CH5, and CH7, the number falls to 252 samples.

Here, the audio data length when transferring a maximum of sixteen channels of 48 kHz audio (or a maximum of eight channels of 96 kHz audio) defined by SMPTE 299M is given as 124 bytes as the sum of four 31-byte audio packets. This value is equal to 124 samples. Then, the amount of 124-byte audio data that can be stored in a region in which the samples can be stored is calculated as follows;

504 samples÷124 samples=4.0645 . . .

252 samples÷124 samples=2.03225 . . .

SMPTE 299M has a premise that a maximum of two 124-byte pieces of audio data are multiplexed based on the 268 samples in the horizontal ancillary data space of an HD-SDI signal that transfers a 1920×1080/30P/4:2:2/10-bit signal.

From this result, it can be understood that the multiplexing unit 14 can multiplex up to 504 samples of audio data and other ancillary data included on each of CH1 and CH3. When multiplexing CH1, CH3, CH5, and CH7, it is possible to multiplex up to 252 samples per channel.

FIG. 15 shows example calculations of Na (the number of audio samples per horizontal line).

A horizontal line of an input image signal includes timing reference signals that show the effective line period of the input image signal and an ancillary data space showing a horizontal ancillary data space on the horizontal line. Only the horizontal ancillary data space of a data stream for a color difference signal (Cr/Cb) is used to transmit audio data packets. However, multiplexing onto a horizontal ancillary data space of a line following a switching point is not allowed.

The number of multiplexed audio data packets that are assigned to one horizontal ancillary data space is limited to Na/2 or below as calculated by the following conditional equation. In this case, the number "No" of audio samples per channel that can be multiplexed in one horizontal ancillary data space is found from a value of Na (Number of Audio Samples) based on the following conditional equation.

No=int(the number of audio samples per line)+1    Equation 1

If No×(the number of entire lines per video frame−the number of switching lines per video frame)<(the number of audio samples per video frame),
 then Na=No+1
 If not, then Na=No
 If audio sample rate=96 kHz, then Na=even function (Na)
 where
 1. The number of audio samples per line=audio sample rate/line frequency
 2. "even function" denotes a function for raising to the nearest even number The multiplexing position is the next horizontal ancillary data space after generation of an audio sample or the horizontal ancillary data space following thereafter. In the case of 48 kHz audio of a 24P signal, Na=2 (Na=4 for 96 kHz audio). This means that when a maximum of 16 channels of 48 kHz audio (or a maximum of 8 channels of 96 kHz audio) are transferred, two samples of 124-byte audio data can be sent.

Figure 16:
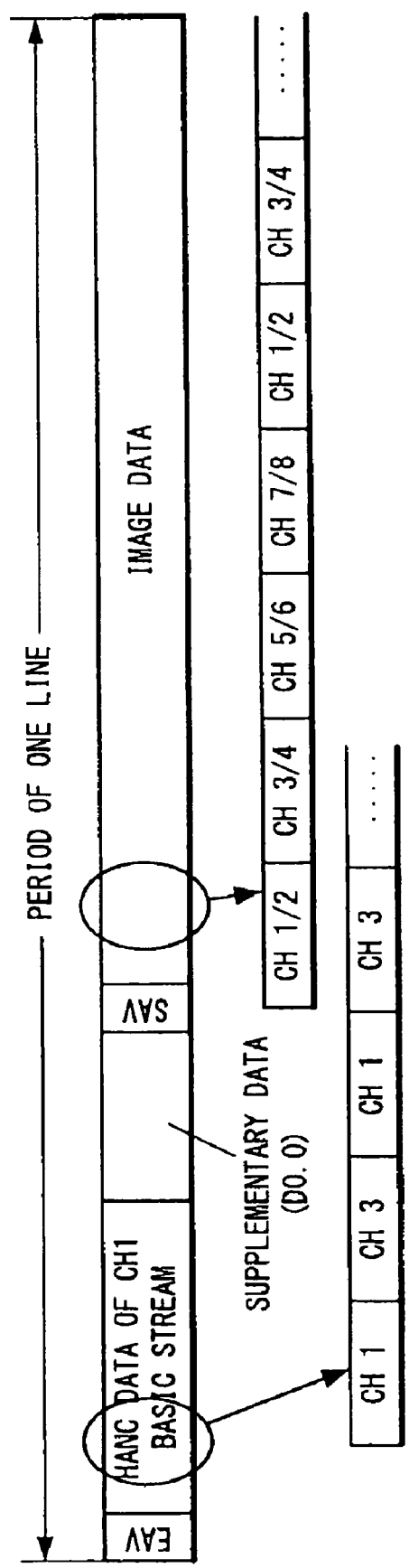
FIG. 16 is a diagram useful in explaining an example of mapping data of the horizontal ancillary data space and image data onto HD-SDI according to Mode C.

FIG. 16 shows an example where the horizontal ancillary data space and image data are multiplexed according to Mode C.

The image data included in one line period is assigned in channel order to the image data region of a 10.692 Gbps stream (transfer data stream).

On the other hand, the horizontal ancillary data space included in one line period is assigned in the order of CH1, CH3 to the horizontal ancillary data space of another 10.692 Gbps stream (transfer data stream). The horizontal ancillary data space may be assigned in the order of CH1, CH3, CH5, CH7 with 252 samples per channel.

Figure 17:
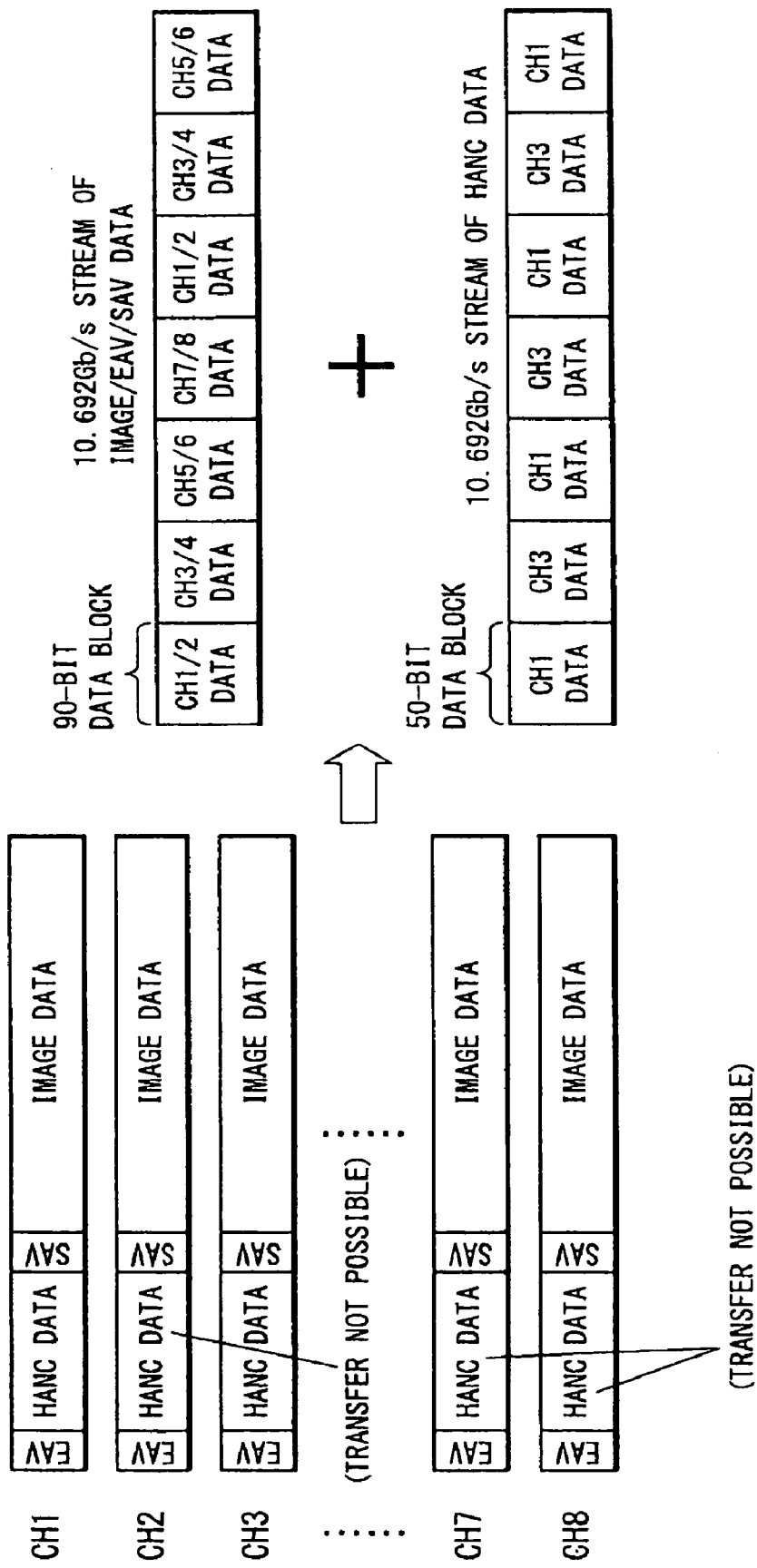
FIG. 17 is a diagram useful in explaining an example of mapping data of the horizontal ancillary data space and image data onto HD-SDI according to Mode C.

FIG. 17 is an example where the horizontal ancillary data space and image data of CH1 to CH8 are multiplexed according to Mode C.

In the present embodiment, the specification of the horizontal ancillary data space in Mode C is extended. That is, 96 kHz audio is mapped in the supplementary data region included in the horizontal ancillary data spaces of the odd-numbered channels CH1, CH3. To map 16 channels of 96 kHz audio, the horizontal ancillary data spaces of at least two channels are sufficient. This means that data of CH1, CH3 are assigned in that order to the horizontal ancillary data space of a second 10.692 Gbps stream. Data of CH1, CH3, CH5, and CH7 may be assigned with 252 samples per channel.

FIG. 18 shows example settings of a multiplexing position flag (mpf) for 48 kHz audio according to the present embodiment.

Referring to FIG. 18, In the case of audio data A, B, C, E, and G, audio data packets are multiplexed in the horizontal ancillary data space (HANC) of the next horizontal line after the position of the second audio sample. In this case, mpf=0.

The multiplexing unit 14 recognizes a first horizontal line that includes a sampling point where an audio signal has been sampled at a predetermined frequency. The multiplexing unit 14 then multiplexes and inserts audio data packets that include audio samples into an ancillary data space of a second horizontal line that follows the first horizontal line. The multiplexing unit 14 then supplies the input image signal into which the audio data packets have been multiplexed and inserted to a data length converting unit 15 (FIG. 7). On the other hand, when the horizontal ancillary data space follows a switching point, to avoid data errors, the multiplexing unit 14 delays the audio data packets by one line and multiplexes the packets into the following line. That is, the multiplexing unit 14 multiplexes and inserts the audio data packets including the audio samples into the ancillary data space of the next horizontal line following the present horizontal line.

Here, N/A (Not Available) shows that it is not possible to multiplex the audio data packets into a horizontal ancillary data space of the next line following a switching point. For example, a switching point is present in the input image signal after a sampling point of the audio data D. For this reason, since the audio data packets are multiplexed into the horizontal ancillary data space of the second line relative to the input timing of the audio samples, mpf=1 is set. By doing so, it is possible to multiplex audio data even when the audio data is delayed by one line after a switching point as shown by the audio data D in FIG. 18.

FIG. 19 shows example settings of the multiplexing position flag (mpf) for 96 kHz according to the present embodiment. The audio data A to H each includes a pair of two samples.

In the case of audio data A, B, C, E, F, and G, audio data packets are multiplexed in the horizontal ancillary data spaces of the next horizontal line after the position of the second audio sample out of the sample pairs. In this case, mpf=0.

The multiplexing unit 14 recognizes the first horizontal line that includes a sampling point where an audio signal has been sampled at a predetermined frequency. The multiplexing unit 14 then multiplexes and inserts audio data packets that include first and second audio samples into an ancillary data space of a second horizontal line that follows the first horizontal line. The multiplexing unit 14 then supplies the input image signal into which the audio data packets have been multiplexed and inserted to the mapping unit 11. On the other hand, when the horizontal ancillary data space follows a switching point, to avoid data errors, the multiplexing unit 14 delays the audio data packets by one line and multiplexes the packets into the following line. That is, the multiplexing unit 14 multiplexes and inserts first audio data packets and second audio data packets following the first audio data packets, which include the first and second audio samples, into the ancillary data space of a third horizontal line that follows the second horizontal line.

As described with reference to FIG. 18, in FIG. 19 also, N/A (Not Available) shows that it is not possible to multiplex audio data packets into the horizontal ancillary data space of the next line following a switching point. A switching point is present between two sampling points of the audio data D in the input image signal. Since the audio data packets are multiplexed in the horizontal ancillary data space on the second line with respect to the input timing of the audio samples, mpf=1 is set for the audio data D included in the output image signal.

Figure 14A:
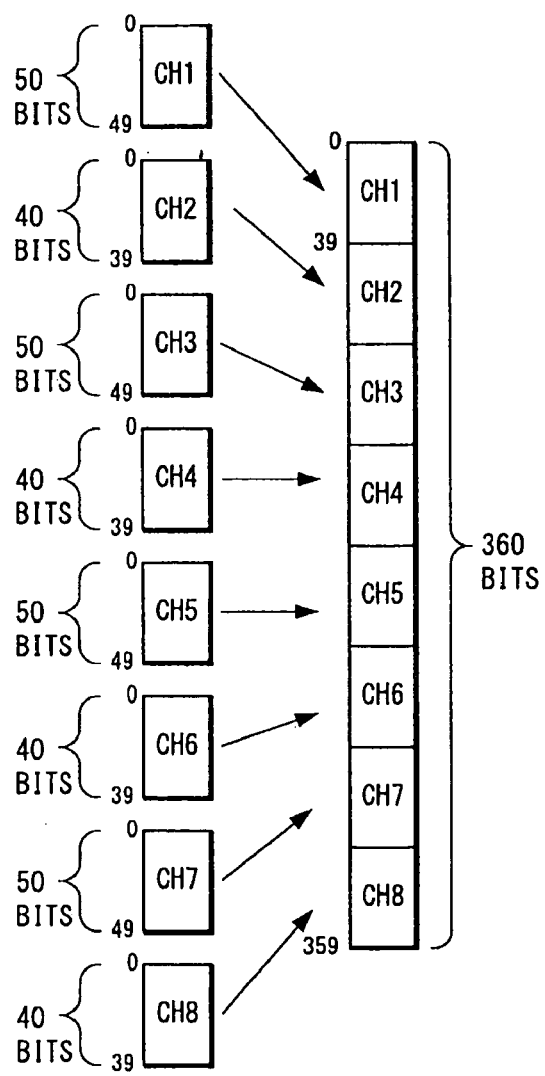
FIG. 14 is a diagram showing how data is multiplexed by the multiplexing unit.
Figure 14B:
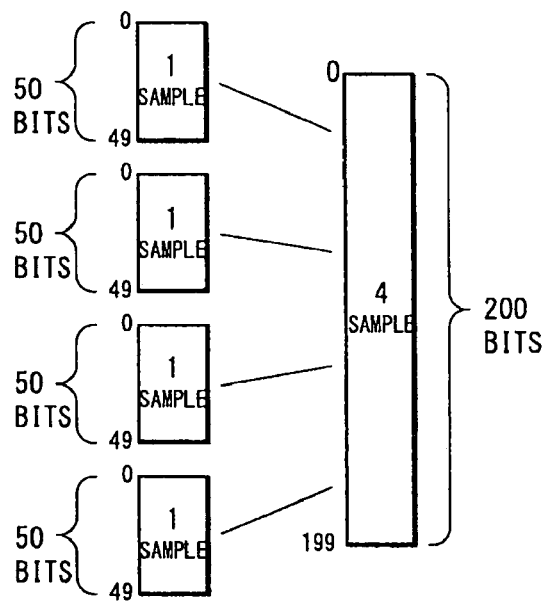

The multiplexing unit 14 multiplexes four samples of the 50-bit parallel digital data of only the horizontal ancillary data space of CH1 that has been read out from the FIFO memories 26 inside the blocks 12-1 to 12-8 of the S/P·8B/10B unit 12 to produce 200-bit data (see FIG. 14B).

Referring to FIG. 7, the 360-bit parallel digital data and 200-bit parallel digital data multiplexed by the multiplexing unit 14 are sent to a data length converting unit 15. The data length converting unit 15 is constructed of a shift register and uses data produced by converting the 360-bit parallel digital data to 256-bit data and data produced by converting the 200-bit parallel digital data to 256-bit data to form parallel 256-bit digital data. The 256-bit parallel digital data is then converted to 128-bit data.

As shown in FIG. 7, the parallel digital data that has been converted to 128-bit data by the data length converting unit 15 is sent to the FIFO memory 16 and is written into the FIFO memory 16 using the 83.5312 MHz clock from the PLL 13.

The 128-bit parallel digital data written into the FIFO memory 16 is read from the FIFO memory 16 as 64-bit parallel digital data using the 167.0625 MHz clock from the PLL 13 shown in FIG. 7 and is sent to a multichannel data forming unit 17.

The multichannel data forming unit 17 is an XSBI (10 Gigabit Ethernet 16-bit Interface: Ethernet is a registered trademark), for example. The multichannel data forming unit 17 uses the 668.25 MHz clock from the PLL 13 to form sixteen channels of serial digital data that each have a bit rate of 668.25 Mbps from the 64-bit parallel digital data from the FIFO memory 16. The sixteen channels of serial digital data formed by the multichannel data forming unit 17 are sent to a multiplexing·P/S conversion unit 18.

The multiplexing·P/S conversion unit 18 multiplexes the sixteen channels of serial digital data from the multichannel data forming unit 17 and by subjecting the multiplexed parallel digital data to parallel/serial conversion, 10.692 Gbps (668.25 Mbps×16) serial digital data is generated. The multiplexing·P/S conversion unit 18 according to the present embodiment functions as a parallel/serial conversion unit that converts the first, second, third, and fourth subimages, mapped by the mapping unit 11, to serial data.

As shown in FIG. 7, the serial digital data with a bit rate of 10.692 Gbps that was generated by the multiplexing·P/S conversion unit 18 is sent to a photoelectric conversion unit 19. The photoelectric conversion unit 19 functions as an output unit that outputs serial digital data with a bit rate of 10.692 Gbps to the CCU 2. The photoelectric conversion unit 19 outputs the 10.692 Gbps transfer stream. The serial digital data with the 10.692 Gbps bitrate that has been converted to an optical signal by the photoelectric conversion unit 19 is transferred from the broadcasting camera 1 to the CCU 2 via the optical fiber cable 3 shown in FIG. 6.

By using the signal transmission apparatus 5 according to the present embodiment, it is possible to carry out signal processing at a transmission side that transmits a 4096×2160/24P/4:4:4/12-bit signal as serial digital data. According to the signal transmission apparatus 5 and this signal transmitting method, the 4096×2160/24P/4:4:4/12-bit signal is mapped onto the HD-SDI signals of CH1 to CH8 (CH1, CH3, CH5, CH7 on LinkA and CH2, CH4, CH6, CH8 on LinkB), such HD-SDI signals are subjected to serial/parallel conversion, and the RGB bits are subjected to 8-bit/10-bit conversion.

On LinkA and LinkB, out of the data on each horizontal line, RGB bits are extracted from only the data of the timing reference signal SAV, the active line, the timing reference signal EAV, the line number LN and the error detection code CRC, and such RGB bits are subjected to 8-bit/10-bit encoding. The data of LinkA and the data of LinkB that have been subjected to 8-bit/10-bit encoding are multiplexed, and 10.692 Gbps serial digital data is generated from the multiplexed parallel digital data. The generated serial digital data is sent to the CCU 2. After this, the CCU 2 generates a 4096×2160/24P/4:4:4/12-bit signal and sends such signal to a VTR or the like (not shown).

Note that instead of just transferring the 4096×2160/24P/4:4:4/12-bit signal from each broadcasting camera 1 to the CCU 2, the return video described earlier (i.e., image data for displaying images being picked up by another broadcasting camera 1) may be transferred from the CCU 2 to the broadcasting cameras 1 via the optical fiber cables 3. However, since such return video is generated using well-known technology (for example, subjecting HD-SDI signals on two channels to eight-bit/ten-bit conversion, multiplexing the resulting data, and then converting the data to serial digital data), description of the circuit construction for doing so is omitted here.

In the image transfer system according to the first embodiment described above, audio signals on a plurality of channels can be mapped into the horizontal ancillary data spaces of CH1, CH3 when Mode C of SMPTE 435 is used. This means that it is possible to increase the amount of data of the HANC/audio signals that can be transferred in Mode C. The mapping unit 11 according to the present embodiment maps multichannel audio into the horizontal ancillary data space of a basic data stream. In particular, with 24P, it is possible to map a maximum of sixteen channels of 96 kHz defined by SMPTE 428-2.

By mapping a 4096×2160/24P/4:4:4/12-bit signal onto the HD-SDI signals of CH1 to CH8 (LinkA and LinkB), it is possible to carry out conversion to serial digital data with a bit rate of 10.692 Gbps for transfer. That is, there is the effect that it is possible to transfer a 4 k×2 k signal that is a next-generation image signal defined by ITU or SMPTE on multiple channels of a 10.692 Gbps transfer path that is in existing use.

Next, an example operation of the mapping unit 11 according to a second embodiment of the present invention will be described with reference to FIGS. 20 to 28.

Here, a method of multiplexing 3840×2160/24/1.001P, 24P, 25P, 30/1.001P, 30P/4:2:2 or 4:4:4/10-bit, 12-bit pixel samples using Mode D defined by SMPTE 435 will be described.

Figure 20:
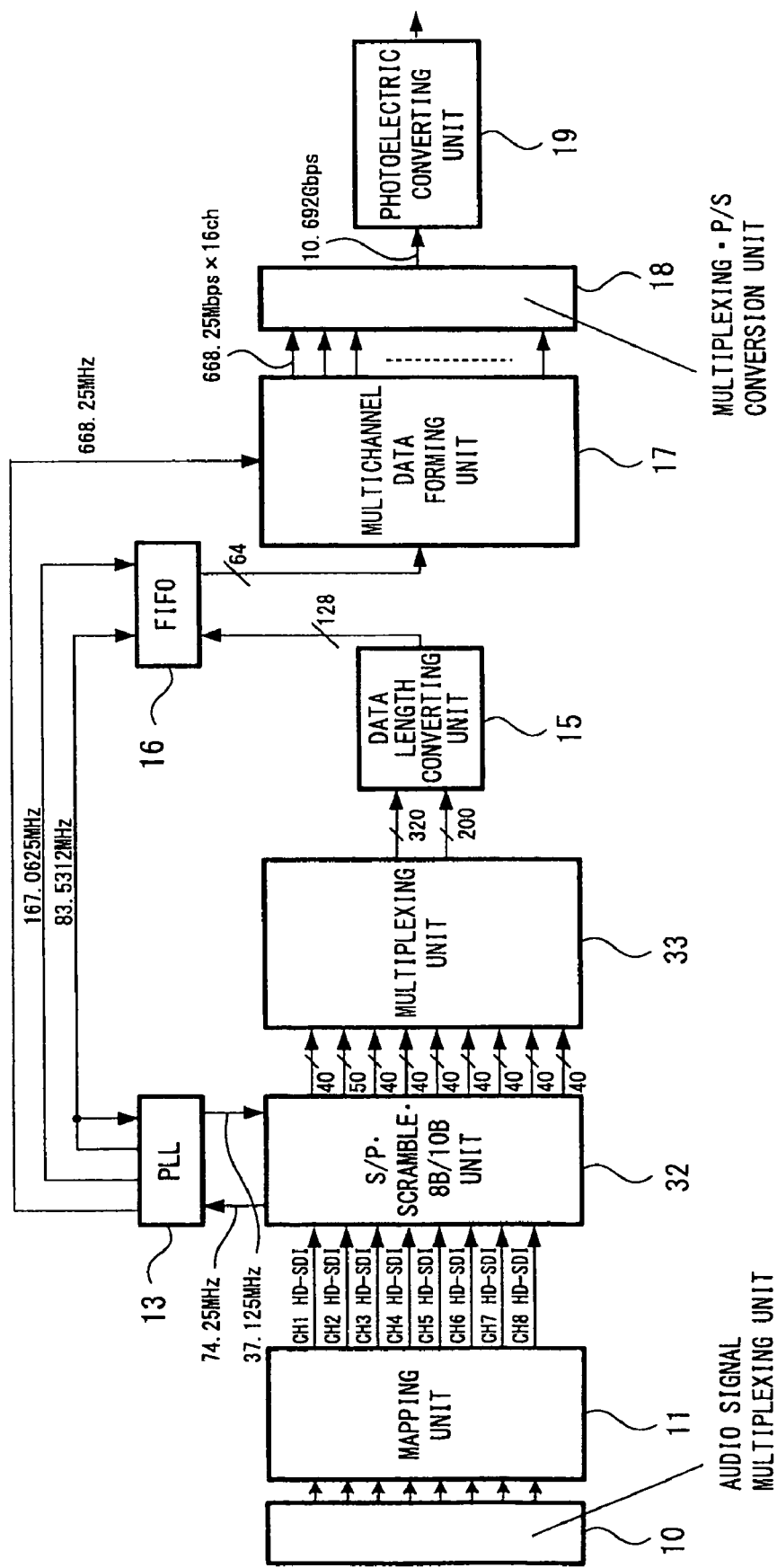
FIG. 20 is a block diagram showing one example of the internal construction of a signal transmission apparatus out of the circuit construction of a broadcasting camera.

FIG. 20 is a block diagram showing a signal transmitting apparatus 31 that relates to the present embodiment out of the circuit construction of the broadcasting camera 1. A 3840×2160/24/1.001P, 24P, 25P, 30/1.001P, 30P/4:2:2 or 4:4:4/10-bit, 12-bit signal generated by the image pickup unit and the image signal processing unit (not shown) in the broadcasting camera 1 is input to the mapping unit 11.

The 3840×2160/24/1.001P, 24P, 25P, 30/1.001P, 30P/4:2:2 or 4:4:4/10-bit, 12-bit signal is a 36 bits wide signal in which a G data series, a B data series and an R data series, each 12 bits wide in word length, are synchronized and aligned in parallel to each other. One frame period is one out of ¹⁄₂₄s, ¹⁄₂₅s, and ¹⁄₃₀s, and 2160 effective line periods are included in one frame period. The input image signal is a signal where the number of pixels in one frame exceeds the number of pixels defined by HD-SDI format. Audio signals are inputted in synchronization with the input image signal. The number of samples in the image data region is 3840, and G, B, and R data are respectively disposed on the active lines of the G data series, B data series, and R data series.

In the present embodiment, data is transferred using a multiplexing method according to Mode D defined by SMPTE 435 (3840×2160/24/1.001P, 24P, 25P, 30/1.001P, 30P/4:2:2 or 4:4:4/10-bit, 12-bit).

First, in the mapping unit 11, a 3840×2160/24/1.001P, 24P, 25P, 30/1.001P, 30P/4:2:2 or 4:4:4/10-bit, 12-bit signal is mapped onto eight channels of transfer streams defined by HD-SDI format.

Figure 21A:
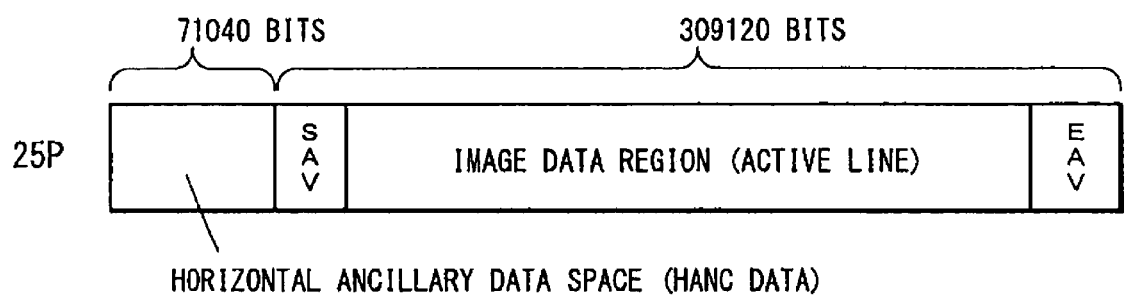
FIGS. 21A and 21B are diagrams showing the construction of one line of 10.692 Gbps serial digital data.
Figure 21B:
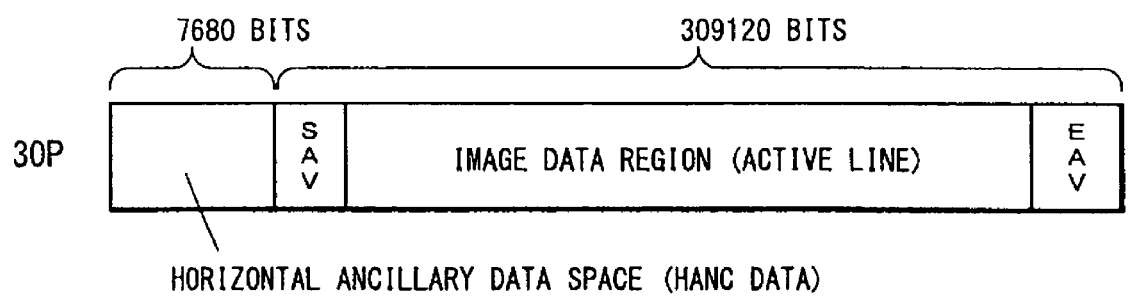

Here, example constructions of one line of 10.692 Gbps serial data in the case of 25P or 30P are shown in FIGS. 21A and 21B.

FIG. 21A is an example construction of one line of serial data in the case of 25P. FIG. 21A shows that in the case of 25P, the horizontal ancillary data space (HANC data) is 71040 bits long.

FIG. 21B is an example construction of one line of serial data in the case of 30P. FIG. 21B shows that in the case of 30P, the horizontal ancillary data space (HANC data) is 7680 bits long.

Figure 22A:
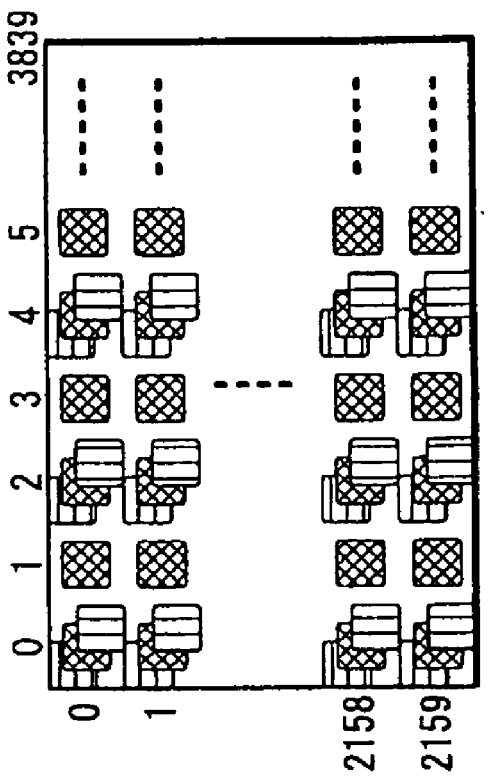
FIGS. 22A and 22B are diagrams showing examples of the sample construction of one frame according to UHDTV standard.
Figure 22B:
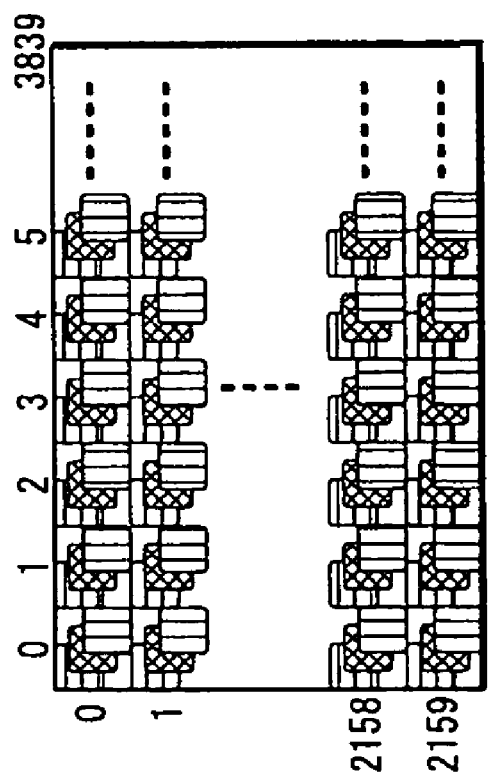

FIGS. 22A and 22B are diagrams showing examples of the sample construction of one frame of an UHDTV standard. The frames used to explain FIGS. 22A to 22B are constructed of 3840×2160 samples (also referred to as "one frame of a 4 k×2 k signal").

There are the following two types of sample construction of one frame in the UHDTV standard. Note that according to SMPTE standard, signals that are marked with dashes like R'G'B' indicate signals that have been subjected to gamma correction and the like.

FIG. 22A is an example of an R'G'B', Y'Cb'Cr' 4:4:4 system. In this system, every sample includes RGB or YCbCr components.

FIG. 22B is an example of a Y'Cb'Cr' 4:2:2 system. In this system, YCbCr components are included in even-numbered samples and Y components are included in odd-numbered samples.

Figure 23:
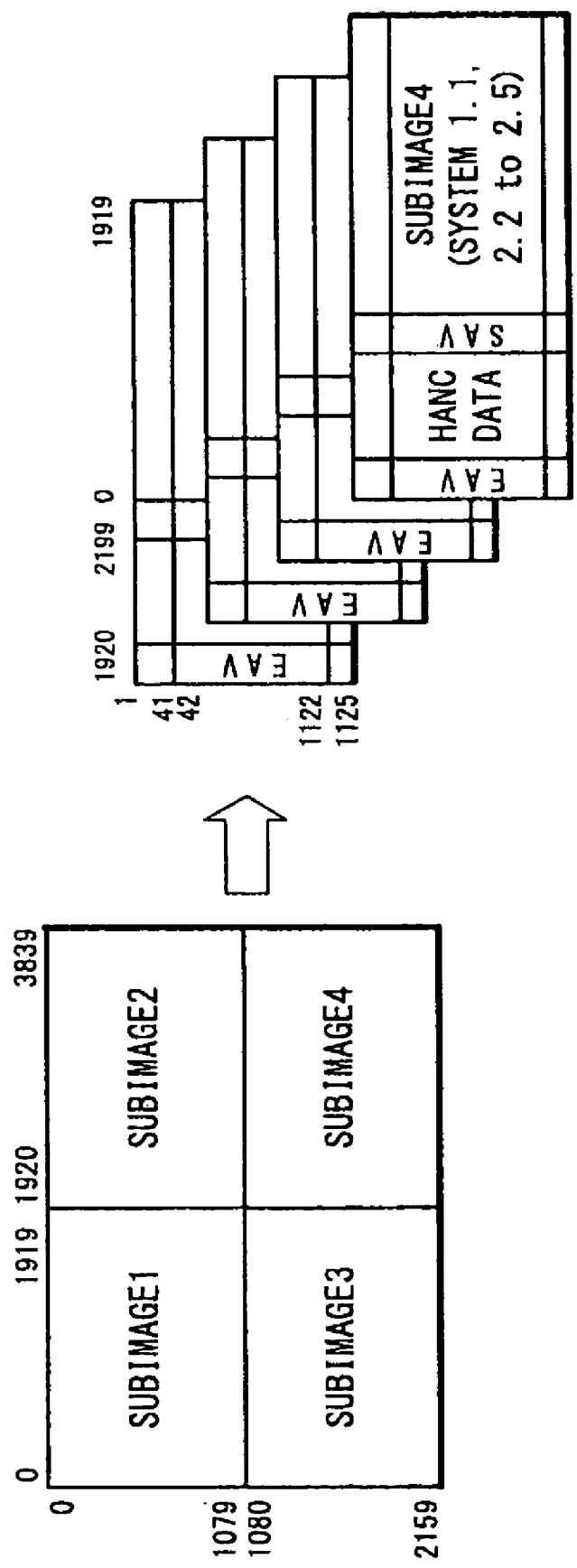
FIG. 23 is a diagram useful in explaining an example of mapping samples included in one frame of a 4 k×2 k signal onto first to fourth subimages.

FIG. 23 shows an example where the mapping unit 11 maps samples included in one frame in a 3840×2160/24/1.001P, 24P, 25P, 30/1.001P, 30P/4:2:2 or 4:4:4/10-bit, 12-bit signal onto four subimages.

First, the mapping unit 11 divides the signal into four 1920×1080/24/1.001P, 24P, 25P, 30/1.001P, 30P/4:2:2 or 4:4:4/10-bit, 12-bit signals by dividing each screen (frame) into four.

The mapping unit 11 maps a frame composed by the 3840×2160/24P, 25P, 30P/4:4:4, 4:2:2/10-bit, 12-bit signal onto HD-SDI signals with a bitrate of 1.485 Gbps or 1.485 Gbps/1.001 (hereinafter simply referred to as "1.485 Gbps") on the eight channels CH1 to CH8 (CH1, CH3, CH5, CH7 on LinkA and CH2, CH4, CH6, CH8 on LinkB) in accordance with SMPTE 435.

The mapping unit 11 maps pixel samples extracted from a frame composed of 3840 samples and 2160 lines onto first to fourth subimages and the pixel samples mapped onto the first to fourth subimages onto HD-SDI signals with a bit rate of 1.485 Gbps on the eight channels CH1 to CH8.

Figure 24:
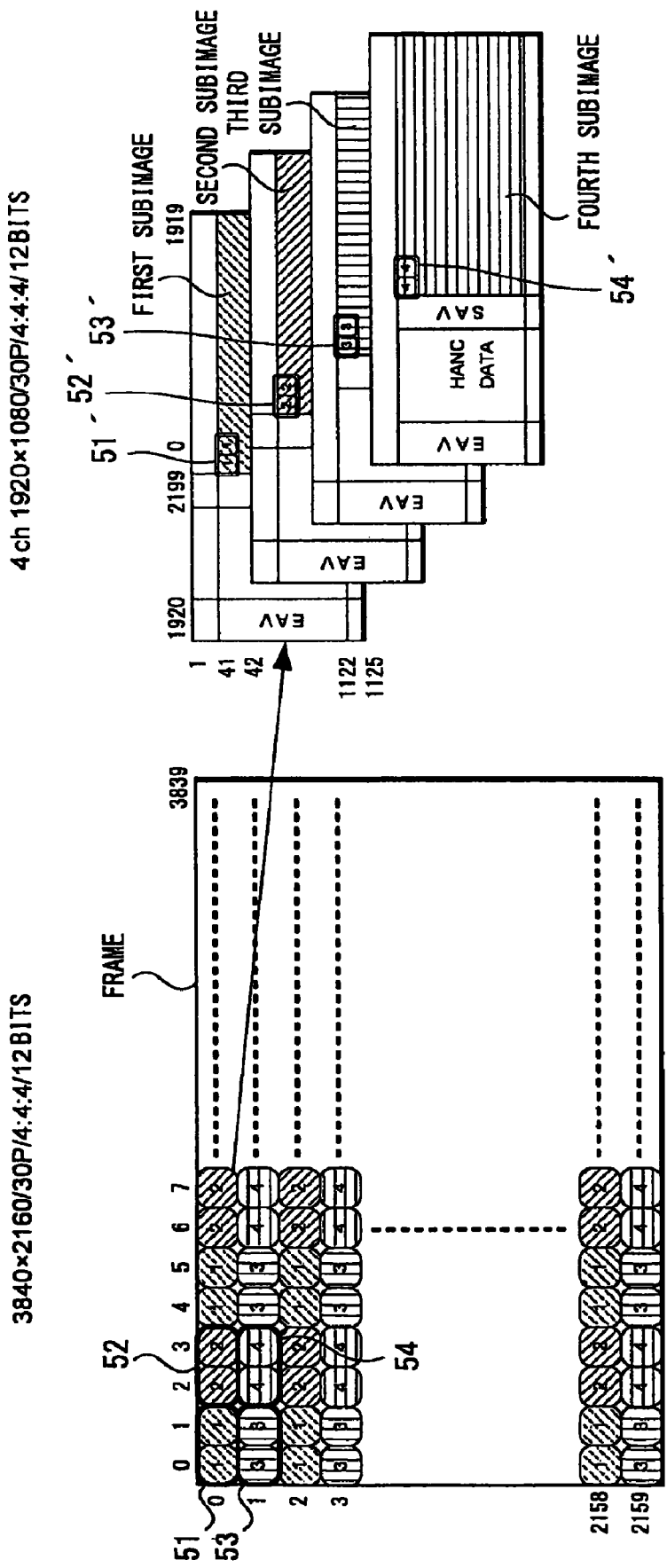
FIG. 24 is a diagram useful in explaining an example of mapping samples included in one frame of a 4 k×2 k signal onto first to fourth subimages.

FIG. 24 is a diagram showing how the mapping unit 11 takes out pixel samples two samples at a time. After the 3840×2160/24P, 25P, 30P/4:4:4 or 4:2:2/10-bit or 12-bit signal has been divided into four, the resulting signals are mapped onto two channels of HD-SDI signals (Link A, LinkB) in accordance with SMPTE 372M.

The mapping unit 11 takes out the pixel samples extracted from each frame in the input image signal a predetermined number of samples at a time. In the present embodiment, the mapping unit 11 takes out two samples that are adjacent on the same line at a time. The mapping unit 11 fetches the samples that were taken out in the same order in each frame, and maps such samples onto the image data regions of first, second, third, and fourth subimages according to HD-SDI format. At this time, the mapping unit 11 maps the audio signals onto the horizontal ancillary data space of the first subimage.

When doing so, the mapping unit 11 maps each pair of two samples on an even-numbered line in each frame alternately onto the first subimage and the second subimage, and maps each pair of two samples on an odd-numbered line of each frame alternately onto the third subimage and the fourth subimage. When the audio signals are mapped onto the horizontal ancillary data space of the first subimage, the phase of the audio signals mapped onto the first subimage is set so as to substantially match the phase of the input image signal.

As a result, samples that construct one frame of a 2 k×1 k signal are mapped onto each of the first to fourth subimages included in an HD-SDI format image data region. Compared to the method of dividing the screen into four that was described with reference to FIG. 23, the method of taking out two samples at a time that was described with reference to FIG. 24 can greatly reduce the delay of signal processing to several lines or thereabouts.

In addition, the mapping unit 11 divides each subimage out of the first, second, third, and fourth subimages that have been mapped between the transfer channel (LinkA) of a first link and the transfer channel (LinkB) of a second link so as to map the divided subimages onto eight channels.

Here, a specific example of mapping of pixel samples will be described. A frame composed of a 4 k×2 k signal includes a plurality of samples. Here, the position of a sample inside a frame is expressed as (sample number, line number).

Referring to FIG. 24, on the $0^{th}$ line, a first sample group 51 that indicates two adjacent samples (0,0), (1,0) is mapped onto (0,42), (1,42) of the first subimage and designated as a first sample group 51'.

Also, on the $0^{th}$ line, a second sample group 52 that indicates two adjacent samples (2,0), (3,0) is mapped onto (0,42), (1,42) of the second subimage and designated as a second sample group 52'.

On the $1^{st}$ line, a third sample group 53 that indicates two adjacent samples (0,1), (1,1) is mapped onto (0,42), (1,42) of the third subimage and designated as a third sample group 53'.

Also, on the $1^{st}$ line, a fourth sample group 54 that indicates two adjacent samples (2,1), (3,1) is mapped onto (0,42), (1,42) of the fourth subimage and designated as a fourth sample group 54'.

Samples are mapped in this way for the following reason.

A frame is constructed according to a format which is one of RGB, YCbCr 4:4:4, YCbCr 4:2:2, and YCbCr 4:2:0.

Although it is not problematic if one frame can be sent using one HD-SDI signal, the amount of data will normally be too large, which makes it impossible to send one frame using a single HD-SDI signal. For this reason, it is necessary to suitably extract the samples (i.e., information including the image signal) from a frame and send the frame as a plurality of subimages.

As shown in FIG. 22A, when a frame is composed of RGB or YCbCr 4:4:4, it will be possible to reproduce the original image regardless of what samples are extracted.

As shown in FIG. 22B, when a frame is composed of YCbCr 4:2:2, odd-numbered samples include only information (Y) on a luminance signal. This means that by mapping onto subimages so that each odd-numbered sample is grouped together with an adjacent even-numbered sample (that will include CbCr), it will be possible to directly reproduce an image from a subimage in a state where the resolution has dropped compared to the original image of the frame.

By mapping samples onto the first to fourth subimages, it becomes possible to send the samples on a dual link (i.e., via two HD-SDI signals). This means that the samples mapped onto the first to fourth subimages can be sent using a total of eight HD-SDI signals.

Figure 25:
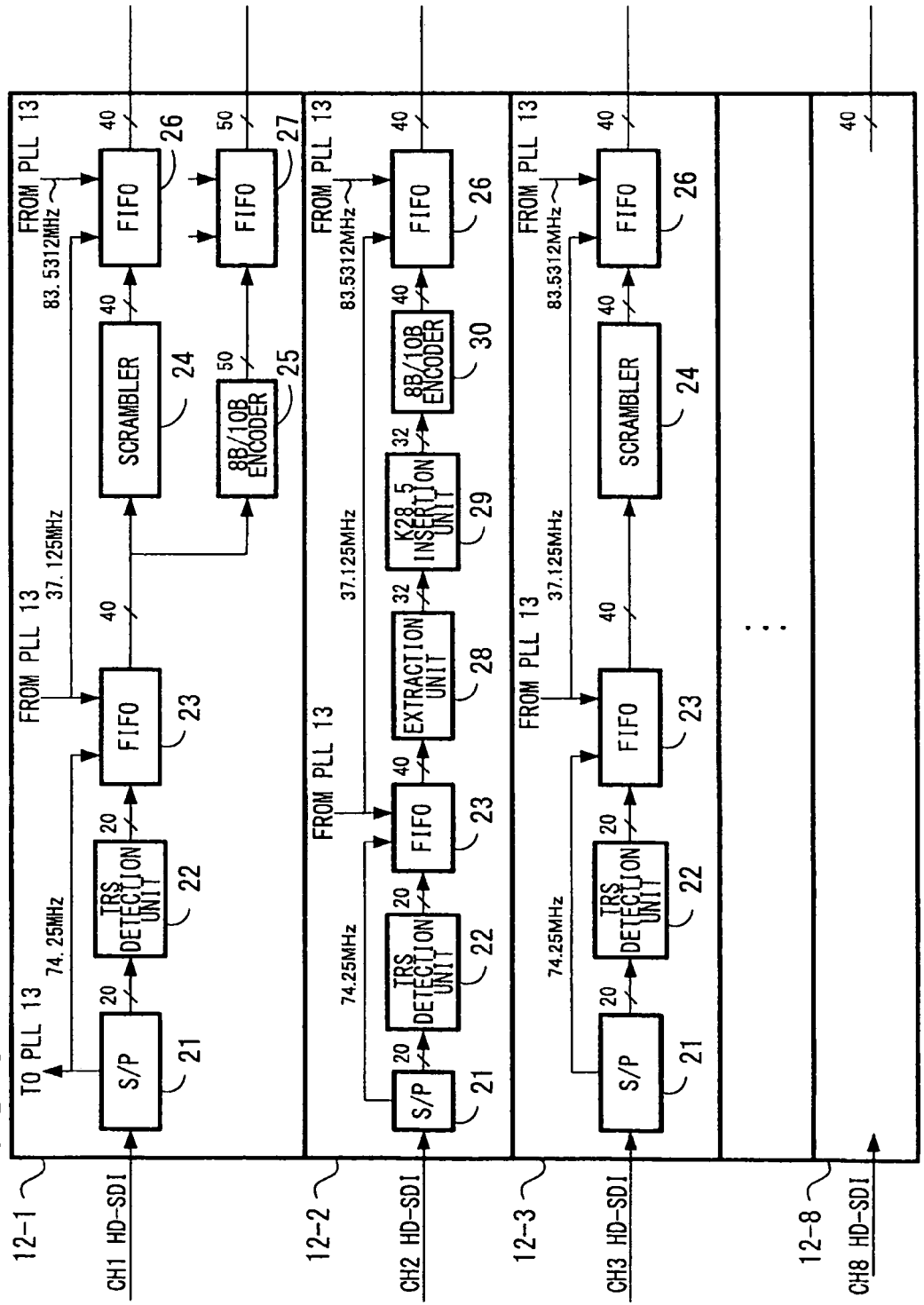
FIG. 25 is a block diagram showing the construction of an S/P·scramble·8B/10B unit.

FIG. 25 is a block diagram showing the construction of an S/P·scramble·8B/10B unit 32. The S/P·scramble·8B/10B unit 32 is composed of eight blocks numbered 12-1 to 12-8 that one-to-one correspond to the channels CH1 to CH8. In FIG. 25, parts that correspond to FIG. 13 that was already described in the first embodiment have been assigned the same reference numerals and detailed description thereof is omitted.

Out of the blocks 12-1, 12-3, 12-5, and 12-7 for the channels CH1, CH3, CH5, and CH7 on LinkA, only the construction of the block 12-1 differs from the construction of the blocks 12-3, 12-5, and 12-7, and the blocks 12-3, 12-5, and 12-7 have the same construction (in FIG. 25, the construction of the block 12-3 is shown but the constructions of the blocks 12-5 and 12-7 are omitted). Conversely, all of the blocks 12-2, 12-4, 12-6, and 12-8 for the channels CH2, CH4, CH6, and CH8 on LinkB have the same construction.

The block 12-1 has the same construction and processing as described in the first embodiment up to the CH1 HD-SDI signal being inputted into the S/P conversion unit 21 and written via the TRS detection unit 22 into the FIFO memory 23.

The PLL 13 shown in FIG. 20 sends a 37.125 MHz clock produced by dividing the 74.25 MHz clock from the S/P conversion unit 21 inside the block 12-1 by two as a read clock to the respective FIFO memories 23 inside the blocks 12-1 to 12-8 and also to the FIFO memories 26 inside the blocks 12-1 to 12-8 and the FIFO memory 27 inside the block 12-1 as a write clock.

The PLL 13 also sends the 83.5312 MHz clock produced by multiplying the frequency of the 74.25 MHz clock from the S/P conversion unit 21 inside the block 12-1 by 9/8 to the FIFO memories 26 inside the blocks 12-1 to 12-8 and the FIFO memory 27 inside the block 12-1 as a read clock and also to the FIFO memory 16 shown in FIG. 20 as a write clock.

The 20-bit parallel digital data written using the 74.25 MHz clock from the S/P conversion unit 21 is read out from the FIFO memory 23 as 40-bit parallel digital data in two sample units using the 37.125 MHz clock from the PLL 13 (see FIG. 20) and sent to a scrambler 24. Also, in the block 12-1, the 40-bit parallel digital data of the horizontal blanking interval read from the FIFO memory 23 is also sent to the 8B/10B encoder 25.

The scrambler 24 is a self-synchronizing scrambler. The self-synchronizing scrambling method used therein is the method adopted in SMPTE 292, in which the transmitter side regards an inputted serial signal as a polynomial, successively divides such signal by the primitive polynomial $X^9+X^4+1$ of order nine, and transfers the resulting quotient so that in statistical terms, the mark ratio (i.e., the ratio of ones and zeros) of the transfer data is ½ on average. The expression "scrambling" here also includes meaning of the encryption of a signal using a primitive polynomial. The quotient is also divided by X+1 and then transmitted as data that is polarity-free (i.e., data where the data and the inverse data contain the same information). At the receiver side, by carrying out a process ("descrambling") that multiplies the received serial signal by X+1 and then multiplies by the primitive polynomial $X^9+X^4+1$ described above, the original serial signal is reproduced.

The scrambler 24 does not scramble the entire data on each horizontal line but instead scrambles the data of only the timing reference signal SAV, the active line, the timing reference signal EAV, the line number LN, and the error detection code CRC, and does not scramble the data of the horizontal blanking interval. Encoding is carried out with the value of a register inside the scrambler set at all zeroes immediately before the timing reference signal SAV, and data up to 10 bits after the error detection code CRC is outputted.

The 40-bit parallel digital data scrambled by the scrambler 24 is written into the FIFO memory 26 using the 37.125 MHz clock from the PLL 13 and is then read out as 40-bit data using the 83.5312 MHz clock from the PLL 13 and sent to a multiplexing unit 33 (see FIG. 20).

The 8B/10B encoder 25 inside the block 12-1 carries out 8-bit to 10-bit conversion on only the data of the horizontal blanking interval out of the 40-bit parallel digital data read out from the FIFO memory 23.

The parallel digital data with a bit width of 50 bits that results from the 8-bit/10-bit conversion by the 8B/10B encoder 25 is written into the FIFO memory 27 using the 37.125 MHz clock from the PLL 13 and is then read out as 50-bit data from the FIFO memory 27 using the 83.5312 MHz clock from the PLL 13 and sent to the multiplexing unit 33.

The blocks 12-2, 12-4, 12-6, and 12-8 for LinkB have substantially the same construction and processing as those described in the first embodiment.

The 16-bit parallel digital data extracted by the extraction unit 28 is read out as 32-bit parallel digital data in units of two samples using the 37.125 MHz clock from the PLL 13 and is sent to the K28.5 insertion unit 29.

The 32-bit parallel digital data that has been processed by the K28.5 inserting unit 29 is sent to the 8B/10B encoder 30. The 8B/10B encoder 30 subjects this 32-bit parallel digital data to 8-bit to 10-bit conversion and outputs the result.

The 32-bit parallel digital data in two sample units is subjected to 8-bit/10-bit encoding by the 8B/10B encoder 30 so that there is compatibility with the upper 40 bits of a 50-bit Content ID in SMPTE 435 that is a 10G interface standard.

The 40-bit parallel digital data subjected to 8-bit/10-bit conversion by the 8B/10B encoder 30 is written into the FIFO memory 26 using the 37.125 MHz clock from the PLL 13 and then read out from the FIFO memory 26 as 40-bit data using the 83.5312 MHz clock from the PLL 13 and sent to the multiplexing unit 33.

The multiplexing unit 33 multiplexes pixel samples mapped on the active periods of eight channels of HD-SDI signals and audio signals mapped on at least one channel out of the eight channels onto a 10.692 Gbps stream (transfer data stream). When doing so, as shown in FIG. 26A, the multiplexing unit 33 multiplexes the 40-bit parallel digital data (data on only the timing reference signal SAV, active line, timing reference signal EAV, line number LN, and error detection code CRC) of CH1 to CH8 read out from the FIFO memories 26 inside the blocks 12-1 to 12-8 of the S/P·scramble·8B/10B unit 32 in 40-bit units in the order of CH2 (a channel subjected to 8-bit to 10-bit conversion), CH1 (a channel subjected to self-synchronizing scrambling), CH4 (a channel subjected to 8-bit to 10-bit conversion), CH3 (a channel subjected to self-synchronizing scrambling), CH6 (a channel subjected to 8-bit to 10-bit conversion), CH5 (a channel subjected to self-synchronizing scrambling), CH8 (a channel subjected to 8-bit to 10-bit conversion), and CH7 (a channel subjected to self-synchronizing scrambling) to produce 320-bit data.

The horizontal blanking interval of a 10G interface has the same data structure as CH1 in the supplementary data (see FIG. 3). By multiplexing the HANC data of an HD-SDI signal of CH3, it is possible to multiplex a maximum of 32 channels of 48 kHz audio and a maximum of 16 channels of 96 kHz audio. By using this method, it is possible to transfer 16 channels of 96 kHz audio defined by SMPTE 428-2.

Figure 26A:
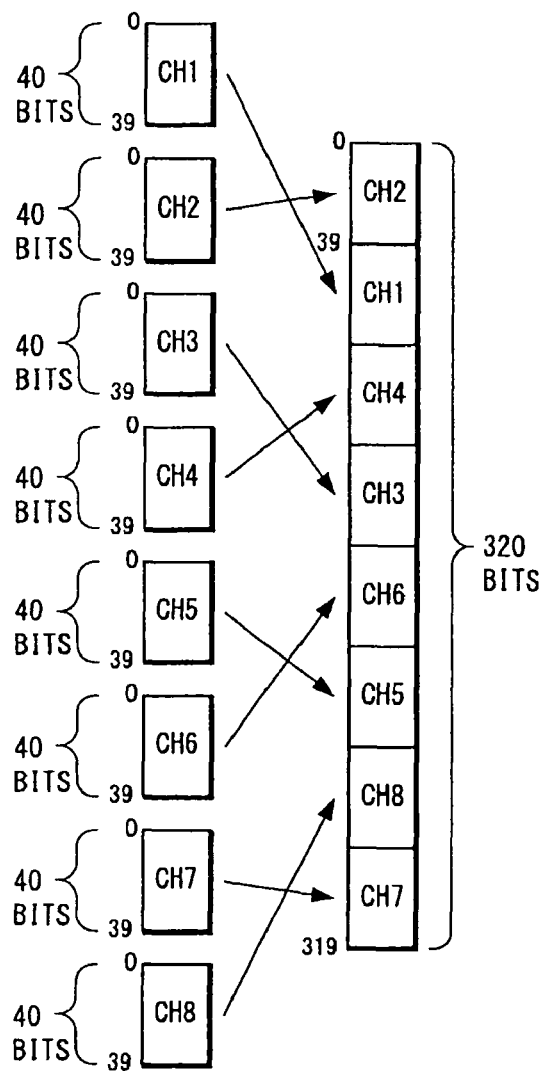
FIG. 26 is a diagram showing how data is multiplexed by the multiplexing unit.
Figure 26B:
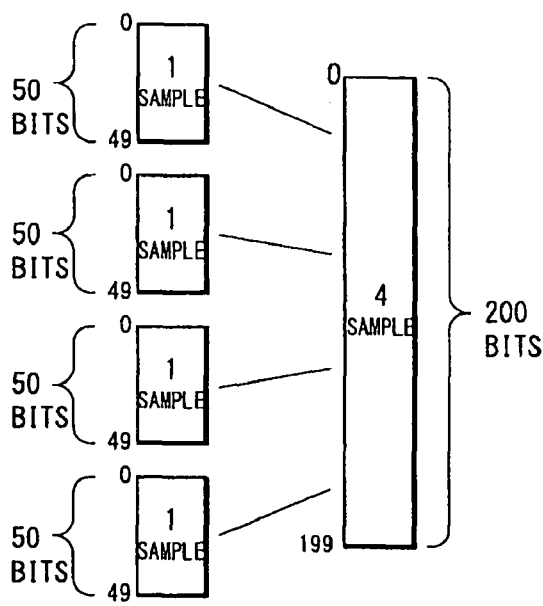

FIGS. 26A and 26B show an example of a data multiplexing process carried out by the multiplexing unit 33.

FIG. 26A shows how the scrambled 40-bit data on CH1 to CH8 are multiplexed into 320-bit data with the order of the pairs of CH1 and CH2, CH3 and CH4, CH5 and CH6, CH7 and CH8 changed.

FIG. 26B shows how data with 50 bits/sample that has been subjected to 8-bit to 10-bit conversion is multiplexed into four samples composed of 200 bits.

In this way, the data that has been subjected to 8-bit/10-bit conversion is sandwiched at intervals of 40 bits by data that has been subjected to self-synchronizing scrambling, and thereby it is possible to eliminate fluctuations in the mark ratio (the proportion of zeros and ones) due to the scrambling method and instability in the transitions of 0-1 and 1-0 and to thereby prevent pathological patterns from occurring.

The multiplexing unit 33 multiplexes four samples of 50-bit parallel digital data of only the horizontal blanking interval of CH1 read from the FIFO memory 27 inside the block 12-1 of the S/P·scramble·8B/10B unit 32 to produce 200-bit data.

The 320-bit parallel digital data and the 200-bit parallel digital data multiplexed by the multiplexing unit 33 are sent to the data length converting unit 15. The data length converting unit 15 is constructed using a shift register and uses data produced by converting the 320-bit parallel digital data to 256-bit data and data produced by converting the 200-bit parallel digital data to a 256-bit data to form 256-bit parallel digital data. The 256-bit parallel digital data is then converted to a 128-bit data.

The multichannel data forming unit 17 forms the 64-bit parallel digital data sent from the data length converting unit 15 via the FIFO memory 16 into sixteen channels of serial digital data that each have a bitrate of 668.25 Mbps. The sixteen channels of serial digital data formed by the multichannel data forming unit 17 are sent to the multiplexing·P/S conversion unit 18.

The multiplexing·parallel/serial conversion unit 18 multiplexes the 16 channels of serial digital data from the multichannel data forming unit 17 and carries out parallel to serial conversion on the multiplexed parallel digital data to generate 10.692 Gbps (668.25 Mbps×16) serial digital data.

As shown in FIG. 20, the serial digital data with a bit rate of 10.692 Gbps that has been generated by the multiplexing·parallel/serial converting unit 18 is sent to a photoelectric converting unit 19. The photoelectric converting unit 19 functions as an output unit that outputs the serial digital data with a bitrate of 10.692 Gbps to the CCU 2. The photoelectric converting unit 19 outputs the 10.692 Gbps stream multiplexed by the multiplexing unit 33. Serial digital data with a bitrate of 10.692 Gbps that has been converted to an optical signal by the photoelectric converting unit 19 is transferred from the broadcasting camera 1 via the fiber optic cable 3 shown in FIG. 6 to the CCU 2.

Figure 27:
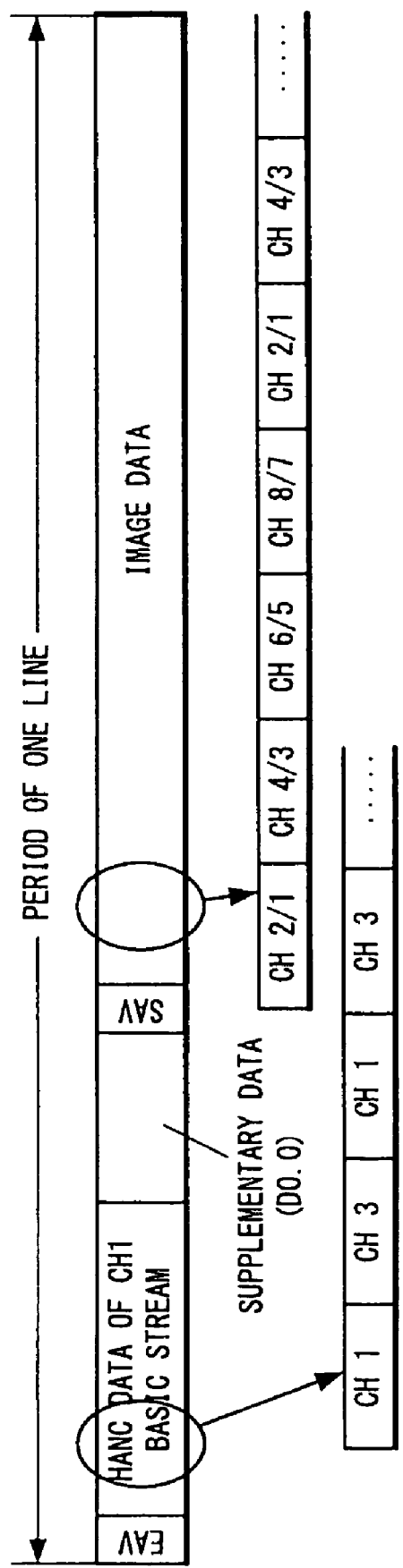
FIG. 27 is a diagram useful in explaining an example of mapping data of the horizontal ancillary data space and image data onto HD-SDI according to Mode D.

FIG. 27 shows an example where the horizontal ancillary data space and image data are multiplexed according to Mode D.

The image data included in one line period is assigned in channel order to a first 10.692 Gbps stream.

On the other hand, the data of the horizontal ancillary data space included in one line period is assigned to a second 10.692 Gbps stream in the order CH1, CH3, CH5, and CH7.

Figure 28:
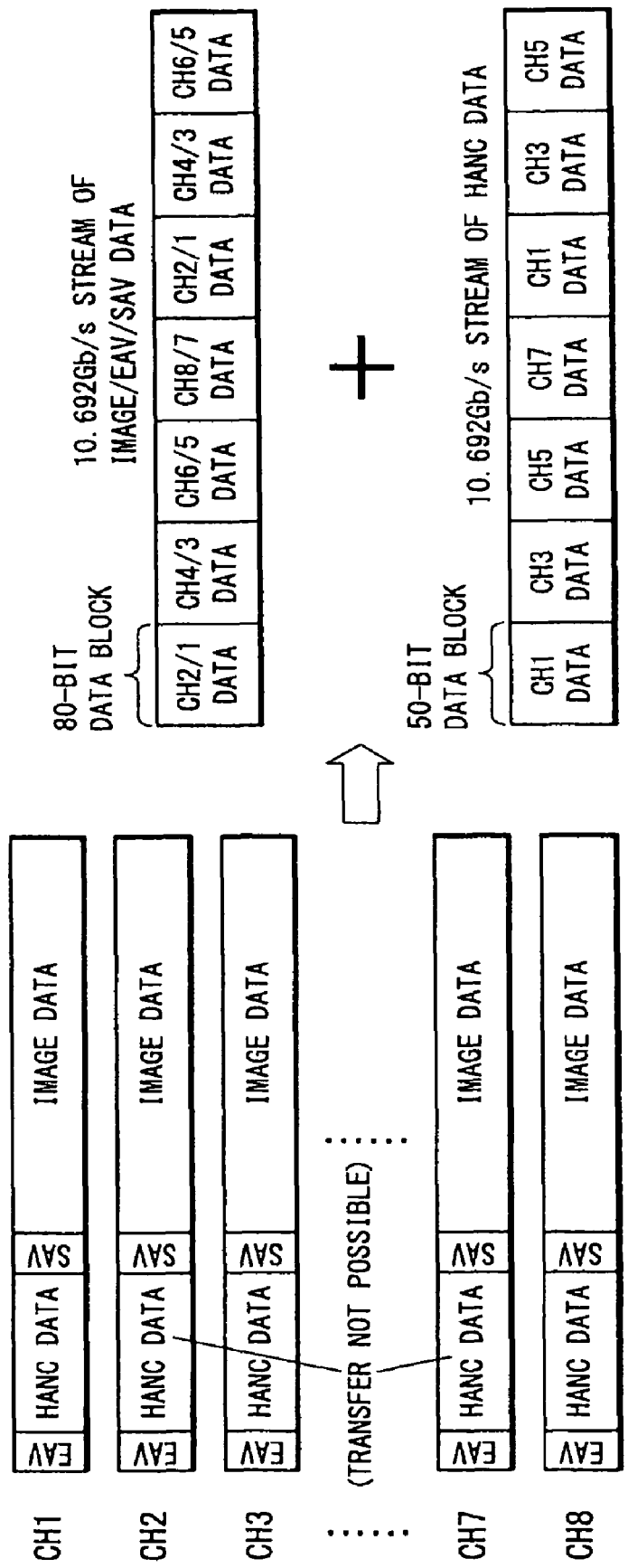
FIG. 28 is a diagram useful in explaining an example of mapping data of the horizontal ancillary data space and image data onto HD-SDI according to Mode D.

FIG. 28 shows an example where the horizontal ancillary data space and the image data of CH1 to CH8 are multiplexed according to Mode D.

In the present embodiment, the specification of the horizontal ancillary data space in Mode D is extended. That is, 96 kHz audio is multiplexed into the supplementary data region included in the horizontal ancillary data spaces of the odd-numbered channels CH1, CH3, CH5, and CH7. For this reason, the data of the horizontal ancillary data spaces of CH1, CH3, CH5, and CH7 are assigned in that order to the second 10.692 Gbps stream.

Here, in Table 5, the amount of data in Mode D of a 10G Interface is shown in 10-bit/word units.

TABLE 5

| System number | Frame rate | No. of words per line | HANC/ EAV/SAV data | Image data | Supplementary data |
|---|---|---|---|---|---|
| 8.2, 8.3, 8.4, 8.5, 8.6, 8.7 | 23.98 Hz or 24 Hz | 39600 | 2237 | 30720 | 6643 |
| | 25 Hz | 38016 | 1962 | 30720 | 5334 |
| | 29.97 Hz or 30 Hz | 31680 | 862 | 30720 | 98 |

Table 5 shows that the supplementary data region is 66430 bits in 24/1.001P and 24P, 53340 bits in 25P, and 980 bits in 30/1.001P and 30P. The amount of data on the horizontal ancillary data space is shown by the following equations. The amount of data that can be stored in the horizontal ancillary data space for each frame rate will now be described.

For 24/1.001P, 24P;

2750 samples (unit data region)–1920 samples (image data region)–12 samples (SAV/EAV/LN/CRC region)=818 samples As a result, it can be understood that it is possible to store the data of 818 samples in the horizontal ancillary data space.

Next, the number of bits in the horizontal ancillary data space is found as follows (Note that one sample is 20 bits long);

818 samples×20 bits×10/8=20450 bits

Since 20450 bits<3×20450 bits=61350 bits<66430 bits from Table 5, it is possible to multiplex all of the data included in the horizontal ancillary data space of CH3. When doing so, as a maximum, it is possible to multiplex the data of the horizontal ancillary data spaces of CH1, CH3, CH5, and CH7.

For 25P;

2640 samples (unit data region)−1920 samples (image data region)−12 samples (SAV/EAV/LN/CRC regions)=708 samples As a result, it can be understood that it is possible to store the data of 708 samples in the horizontal ancillary data space.

Next, the number of bits in the horizontal ancillary data space is found as follows;

708 samples×20 bits×10/8=17700 bits.

Since 17700 bits<3×17700 bits=53100 bits<53340 bits from Table 5, it is possible to multiplex all of the data included in the horizontal ancillary data space of CH3. When doing so, as a maximum, it is possible to multiplex the data of the horizontal ancillary data spaces of CH1, CH3, CH5, and CH7.

For 30/1.001P, 30P;

2200 samples (unit data region)−1920 samples (image data region)−12 samples (SAV/EAV/LN/CRC regions)=268 samples As a result, it can be understood that it is possible to store the data of 268 samples in the horizontal ancillary data space.

Next, the number of bits in the horizontal ancillary data space is found as follows;

268 samples×20 bits×10/8=6700 bits

Since 6700 bits>980 bits from Table 5, it is not possible to multiplex any of the channels aside from CH1.

Also, the number of samples that can be stored in the supplementary data region is 39.2 (980 bits+20 bits×8/10).

That is, as shown in FIG. 8 of SMPTE 299M, it is not possible to send two packets of audio data that are 31 bytes long. That is, it can be said that it is not possible to multiplex audio data when the switching points and the 1.422 . . . audio samples per line are considered.

If the 268 samples that can be stored in the horizontal ancillary data space and the 39.2 samples described above are added, 307.2 samples (268 samples+39.2 samples) are obtained as the region for storing the audio data. When the obtained 307.2 samples are divided by 31 samples as the minimum unit of audio data packets, the maximum number of two-sample pairs of 96 kHz audio (see FIG. 19) that can be stored is calculated as follows;

307.2 samples÷31 samples=9.90967.

48 kHz audio and 96 kHz audio are constructed of two-packet units. In the present embodiment, since the maximum number of two-sample pairs of 96 kHz audio is 9.90967, a maximum of eight channels of audio data are stored. That is, even when the audio data is divided in two between CH1 and CH3, the audio data packet is 31 bytes, and a maximum of sixteen channels of 48 kHz audio (a maximum of eight channels for 96 kHz) can be multiplexed and transferred.

By using the signal transmission apparatus 5 in the present embodiment, it is possible to carry out signal processing at a transmitter side that transmits a 3840×2160/24/1.001P, 24P, 25P, 30/1.001P, 30P/4:2:2 or 4:4:4/10-bit, 12-bit signal as serial digital data. According to this signal transmission method and the signal transmitting apparatus 5, a 3840×2160/24/1.001P, 24P, 25P, 30/1.001P, 30P/4:4:4, 4:2:2, 4:2:0/10-bit, 12-bit signal is mapped onto HD-SDI signals on the channels CH1 to CH8 (CH1, CH3, CH5, CH7 on LinkA and CH2, CH4, CH6, CH8 on LinkB), the respective HD-SDI signals are subjected to serial/parallel conversion, and then LinkA is subjected to self-synchronizing scrambling and the RGB bits on Link B are subjected to eight-bit/ten-bit conversion.

On LinkA, instead of subjecting all of the data on every horizontal line to self-synchronizing scrambling, self-synchronizing scrambling is carried out only on the timing reference signal SAV, the active line, the timing reference signal EAV, the line number LN, and the error detection code CRC, and self-synchronizing scrambling is not carried out on the data of the horizontal blanking interval. Conversion is carried out after setting the value in the register inside the scrambler at all zeroes immediately before the timing reference signal SAV and data is outputted up to at least a few bits following the error detection code CRC.

On LinkB, out of the data on each horizontal line, the RGB bits are extracted from only the data of the timing reference signal SAV, the active line, the timing reference signal EAV, the line number LN, and the error detection code CRC, with such RGB bits then being subjected to eight-bit/ten-bit conversion. After this, the data on LinkA that has been subjected to self-synchronizing scrambling and the data on LinkB that has been subjected to eight-bit/ten-bit conversion are multiplexed and serial digital data with a bit rate of 10.692 Gbps is generated from the multiplexed parallel digital data. The generated serial digital data is sent to the CCU 2. The CCU 2 generates a 3840×2160/24/1.001P, 24P, 25P, 30/1.001P, 30P/4:2:2 or 4:4:4/10-bit, 12-bit signal and sends such signal to a VTR or the like (not shown).

Note that not only is a 3840×2160/24/1.001P, 24P, 25P, 30/1.001P, 30P/4:2:2 or 4:4:4/10-bit, 12-bit signal transferred from each broadcasting camera 1 to the CCU 2 in this way, but also the return video described earlier (i.e., an image signal for displaying images that are being picked up by another broadcasting camera 1) is transferred via the fiber optic cables 3 from the CCU 2 to the respective broadcasting cameras 1. However, since such return video is generated using well-known technology (for example, subjecting HD-SDI signals on two channels to eight-bit/ten-bit conversion, multiplexing the resulting data, and then converting the data to serial digital data), description of the circuit construction for doing so is omitted here.

According to the second embodiment described above, by mapping a 3840×2160/24/1.001P, 24P, 25P, 30/1.001P, 30P/4:2:2 or 4:4:4/10-bit, 12-bit signal onto LinkA and LinkB of a Dual-Link 292, it is possible to convert the data to serial digital data with a bit rate of 10.692 Gbps and transfer the data. When doing so, audio signals on multiple channels can be multiplexed on the horizontal ancillary data spaces of CH1, CH3, CH5, and CH7. This means that there is the effect that it is possible to transfer data on multiple channels of a 10.692 Gbps serial interface in existing use.

The mapping unit 11 divides one frame of the 4 k×2 k signal into four subimages and maps pixel samples of the frame onto the respective subimages, or maps the pixel samples of the frame onto the respective subimages by extracting two samples at a time. The samples mapped onto the respective subimages include all of the samples in one frame that is the original image. By individually observing the subimages, it is possible to observe full-screen images on an existing HD monitor, a waveform monitor, or the like. This is effective during the development of image appliances and when analyzing problems in the optical fiber cables 3 or the like.

Note that although the present invention has been applied to a camera transfer system in the embodiments described above, it is also possible to apply the present invention to transferring signals according to a variety of other methods. In this way, the present invention can be applied when transmitting a variety of signals.

The present application contains subject matter related to that disclosed in Japanese Priority Patent Application JP 2008-137245 filed in the Japan Patent Office on May 26, 2008.

It should be understood by those skilled in the art that various modifications, combinations, sub-combinations and alterations may occur depending on design requirements and other factors insofar as they are within the scope of the appended claims or the equivalents thereof.

What is claimed is:

1. A signal transmitting apparatus comprising:
a mapping unit that is configured, in response to transmitting an input image signal where a number of pixels in one frame exceeds a number of pixels defined by high-definition serial digital interface (HD-SDI) format and an audio signal inputted in synchronization with the input image signal, to divide each frame in the input image signal into first, second, third, and fourth subimages and map respective pixel samples of the first, second, third and fourth subimages onto image data regions of two-channel HD-SDI signals, respectively, and to map the audio signal onto supplementary data regions included in horizontal ancillary data spaces of any of the two-channel HD-SDI signals onto which the respective pixel samples of the first, second, third, and fourth subimages are mapped, respectively;
a multiplexing unit that multiplexes the pixel samples mapped onto the image data regions of the two-channel HD-SDI signals onto an image data region of a first transfer data stream and the audio signal mapped onto the supplemental data regions included in horizontal ancillary data spaces of any of the two-channel HD-SDI signals onto a horizontal ancillary data space of a second transfer data stream; and
an output unit that outputs the first and second transfer data streams sent from the multiplexing unit.

2. The signal transmitting apparatus according to claim 1, wherein a sampling frequency of the input audio signal is one of 48kHz and 96kHz, and the mapping unit is configured to map, when a supplementary data region of one of two channels of a two-channel HD-SDI signal onto which the audio signal is mapped is insufficient, the audio signal onto a supplementary data region of the other channel of the two channels.

3. The signal transmitting apparatus according to claim 2, wherein the mapping unit is configured to divide each frame in the input image signal into the first, second, third and fourth subimages by mapping pixel samples of the frame to respective subimages in units of two pixel samples that are adjacent to each other on a line of the frame, two pixel samples of each unit on even-numbered lines in the frame being mapped alternately onto the first subimage and the second subimage and two pixel samples of each unit on odd-numbered lines in the frame being mapped alternately onto the third subimage and the fourth subimage, and to map the audio signal onto a horizontal ancillary data space of two channels of a two-channel HD-SDI signal onto which the first subimage is mapped, and
wherein a phase of the audio signal when the audio signal is mapped onto the horizontal ancillary data space of two channels of the two-channel HD-SDI signal onto which the first subimage is mapped is set so as to substantially match a phase of the input image signal.

4. A signal transmitting method for transmitting an input image signal where a number of pixels in one frame exceeds a number of pixels defined by a high-definition serial digital interface (HD-SDI) format and an audio signal inputted in synchronization with the input image signal, the method comprising steps of:
dividing each frame in the input image signal into first, second, third, and fourth subimages, mapping respective pixel samples of the first, second, third and fourth subimages onto image data regions of two-channel HD-SDI signals, respectively, and mapping the audio signal onto supplementary data regions included in horizontal ancillary data spaces of any of the two-channel HD-SDI signals onto which the respective pixel samples of the first, second, third, and fourth subimages are mapped, respectively;
multiplexing the pixel samples mapped onto the image data regions of the two-channel HD-SDI signals onto an image data region of a first transfer data stream and the audio signal mapped onto the supplemental data regions included in horizontal ancillary data spaces of any of the two-channel HD-SDI signals onto a horizontal ancillary data space of a second transfer data stream; and
outputting the first and second transfer data streams.

5. A signal transmitting apparatus for transmitting an input image signal where a number of pixels in one frame exceeds a number of pixels defined by a high-definition serial digital interface (HD-SDI) format and an audio signal inputted in synchronization with the input image signal, the apparatus comprising:
means for dividing each frame in the input image signal into first, second, third, and fourth subimages, mapping respective pixel samples of the first, second, third and fourth subimages onto image data regions of two-channel HD-SDI signals, respectively, and mapping the audio signal onto supplementary data regions included in horizontal ancillary data spaces of any of the two-channel HD-SDI signals onto which the respective pixel samples of the first, second, third, and fourth subimages are mapped, respectively;
means for multiplexing the pixel samples mapped onto the image data regions of the two-channel HD-SDI signals onto an image data region of a first transfer data stream and the audio signal mapped onto the supplemental data regions included in horizontal ancillary data spaces of any of the two-channel HD-SDI signals onto a horizontal ancillary data space of a second transfer data stream; and
means for outputting the first and second transfer data streams.

* * * * *